United States Patent
Goldberg et al.

(10) Patent No.: US 11,003,685 B2
(45) Date of Patent: May 11, 2021

(54) COMMIT PROTOCOL FOR SYNCHRONIZING CONTENT ITEMS

(71) Applicant: Dropbox, Inc., San Francisco, CA (US)

(72) Inventors: Isaac Goldberg, San Francisco, CA (US); Sujay Jayakar, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 359 days.

(21) Appl. No.: 15/867,612

(22) Filed: Jan. 10, 2018

(65) Prior Publication Data

US 2019/0205443 A1  Jul. 4, 2019

Related U.S. Application Data

(60) Provisional application No. 62/611,473, filed on Dec. 28, 2017.

(51) Int. Cl.
*G06F 16/27* (2019.01)
*G06F 16/11* (2019.01)
(Continued)

(52) U.S. Cl.
CPC ............... *G06F 16/27* (2019.01); *G06F 1/04* (2013.01); *G06F 3/065* (2013.01); *G06F 3/067* (2013.01);
(Continued)

(58) Field of Classification Search
CPC ...... G06F 16/27; G06F 16/907; G06F 16/162; G06F 16/1844
See application file for complete search history.

(56) References Cited

U.S. PATENT DOCUMENTS

| | | |
|---|---|---|
| 5,335,346 A | 8/1994 | Fabbio |
| 5,745,750 A | 4/1998 | Porcaro |

(Continued)

FOREIGN PATENT DOCUMENTS

| | | |
|---|---|---|
| AU | 2008202290 B2 | 5/2010 |
| CN | 1255748 C | 5/2006 |

(Continued)

OTHER PUBLICATIONS

Non-Final Office Action for U.S. Appl. No. 15/868,511 dated Feb. 5, 2020, 11 pages.

(Continued)

*Primary Examiner* — Kannan Shanmugasundaram
(74) *Attorney, Agent, or Firm* — Polsinelli PC

(57) ABSTRACT

In some embodiments, a client generates an operation modifying a local copy of a content item on a user account at a content management system and records an intent to commit the operation to a journal of revisions at the content management system. Based on the operation, the client sends to the content management system a first request to commit the operation at the journal, the first request including a cursor identifying a current position of the client in the journal. The client sends, to the content management system, a second request for a status of the commit and, based on the second request, determines whether the commit of the operation to the journal has succeeded. Based on whether the commit of the operation to the journal has succeeded, the client determines whether to update one or more tree data structures on the client and clear the intent to commit.

20 Claims, 18 Drawing Sheets

(51) Int. Cl.
| | | |
|---|---|---|
| G06F 16/18 | (2019.01) | |
| G06F 16/178 | (2019.01) | |
| G06F 16/176 | (2019.01) | |
| G06F 3/06 | (2006.01) | |
| G06F 21/60 | (2013.01) | |
| G06F 21/62 | (2013.01) | |
| H04L 29/06 | (2006.01) | |
| H04L 29/08 | (2006.01) | |
| G06F 16/958 | (2019.01) | |
| G06F 16/2455 | (2019.01) | |
| G06F 16/951 | (2019.01) | |
| G06F 16/172 | (2019.01) | |
| G06F 1/04 | (2006.01) | |
| G06F 9/54 | (2006.01) | |
| G06F 11/14 | (2006.01) | |
| G06F 12/14 | (2006.01) | |
| G06F 21/10 | (2013.01) | |
| H04L 9/32 | (2006.01) | |
| G06F 16/23 | (2019.01) | |
| G06F 16/22 | (2019.01) | |
| G06F 16/182 | (2019.01) | |
| G06F 16/185 | (2019.01) | |
| G06F 16/16 | (2019.01) | |
| G06F 16/13 | (2019.01) | |
| G06F 16/174 | (2019.01) | |
| G06F 16/14 | (2019.01) | |
| G06F 16/907 | (2019.01) | |
| G06F 16/17 | (2019.01) | |
| G06F 16/901 | (2019.01) | |
| G06F 16/955 | (2019.01) | |

(52) U.S. Cl.
CPC .......... *G06F 3/0619* (2013.01); *G06F 3/0623* (2013.01); *G06F 3/0629* (2013.01); *G06F 3/0652* (2013.01); *G06F 9/547* (2013.01); *G06F 11/1469* (2013.01); *G06F 12/1466* (2013.01); *G06F 16/11* (2019.01); *G06F 16/113* (2019.01); *G06F 16/116* (2019.01); *G06F 16/119* (2019.01); *G06F 16/122* (2019.01); *G06F 16/125* (2019.01); *G06F 16/128* (2019.01); *G06F 16/13* (2019.01); *G06F 16/137* (2019.01); *G06F 16/148* (2019.01); *G06F 16/152* (2019.01); *G06F 16/156* (2019.01); *G06F 16/16* (2019.01); *G06F 16/162* (2019.01); *G06F 16/168* (2019.01); *G06F 16/172* (2019.01); *G06F 16/176* (2019.01); *G06F 16/178* (2019.01); *G06F 16/1734* (2019.01); *G06F 16/1744* (2019.01); *G06F 16/1767* (2019.01); *G06F 16/1787* (2019.01); *G06F 16/18* (2019.01); *G06F 16/182* (2019.01); *G06F 16/183* (2019.01); *G06F 16/184* (2019.01); *G06F 16/185* (2019.01); *G06F 16/1827* (2019.01); *G06F 16/1844* (2019.01); *G06F 16/2246* (2019.01); *G06F 16/2255* (2019.01); *G06F 16/2322* (2019.01); *G06F 16/2358* (2019.01); *G06F 16/2365* (2019.01); *G06F 16/2379* (2019.01); *G06F 16/24552* (2019.01); *G06F 16/275* (2019.01); *G06F 16/907* (2019.01); *G06F 16/9027* (2019.01); *G06F 16/951* (2019.01); *G06F 16/955* (2019.01); *G06F 16/958* (2019.01); *G06F 21/10* (2013.01); *G06F 21/604* (2013.01); *G06F 21/6218* (2013.01); *H04L 9/3213* (2013.01); *H04L 9/3247* (2013.01); *H04L 63/08* (2013.01); *H04L 63/0853* (2013.01); *H04L 63/10* (2013.01); *H04L 63/101* (2013.01); *H04L 63/102* (2013.01); *H04L 67/06* (2013.01); *H04L 67/1095* (2013.01); *H04L 67/1097* (2013.01); *G06F 2201/84* (2013.01); *G06F 2212/1052* (2013.01); *G06F 2221/2141* (2013.01); *H04L 67/306* (2013.01); *H04L 67/42* (2013.01)

(56) References Cited

U.S. PATENT DOCUMENTS

| | | |
|---|---|---|
| 5,778,389 A | 7/1998 | Pruett et al. |
| 5,802,508 A | 9/1998 | Morgenstern |
| 5,956,715 A | 9/1999 | Glasser et al. |
| 6,269,371 B1 | 7/2001 | Ohnishi |
| 6,408,298 B1 | 6/2002 | Van et al. |
| 6,421,684 B1 | 7/2002 | Cabrera et al. |
| 6,427,123 B1 | 7/2002 | Sedlar |
| 6,560,655 B1 | 5/2003 | Grambihler et al. |
| 6,574,665 B1 | 6/2003 | Khotimsky |
| 6,618,735 B1 | 9/2003 | Krishnaswami et al. |
| 6,944,623 B2 | 9/2005 | Kim |
| 7,024,392 B2 | 4/2006 | Stefik et al. |
| 7,051,039 B1 | 5/2006 | Murthy et al. |
| 7,080,041 B2 | 7/2006 | Nagel |
| 7,275,177 B2 | 9/2007 | Armangau et al. |
| 7,313,598 B1 | 12/2007 | Sheth |
| 7,487,228 B1 | 2/2009 | Preslan et al. |
| 7,526,575 B2 | 4/2009 | Rabbers et al. |
| 7,529,931 B2 | 5/2009 | Vasishth et al. |
| 7,567,991 B2 | 7/2009 | Armangau et al. |
| 7,606,876 B2 | 10/2009 | Graves et al. |
| 7,634,482 B2 | 12/2009 | Mukherjee et al. |
| 7,634,514 B2 | 12/2009 | Langan et al. |
| 7,657,769 B2 * | 2/2010 | Marcy ............... G06F 16/1837 707/695 |
| 7,660,809 B2 | 2/2010 | Cortright et al. |
| 7,685,206 B1 | 3/2010 | Mathew et al. |
| 7,734,690 B2 | 6/2010 | Moromisato et al. |
| 7,761,497 B1 | 7/2010 | O'Connell, Jr. et al. |
| 7,805,469 B1 | 9/2010 | Nagaralu et al. |
| 7,809,828 B2 | 10/2010 | Burnett et al. |
| 7,886,016 B1 | 2/2011 | Tormasov |
| 7,895,158 B2 | 2/2011 | Bosloy et al. |
| 7,917,494 B2 | 3/2011 | Muller |
| 7,925,631 B1 | 4/2011 | Thillai et al. |
| 7,962,950 B2 | 6/2011 | Choo et al. |
| 8,015,204 B2 | 9/2011 | Kaler et al. |
| 8,069,226 B2 | 11/2011 | Momchilov et al. |
| 8,099,452 B2 | 1/2012 | Chkodrov et al. |
| 8,117,151 B2 | 2/2012 | Nakatani et al. |
| 8,156,151 B2 | 4/2012 | Sidman |
| 8,180,747 B2 | 5/2012 | Marinkovic et al. |
| 8,180,983 B1 | 5/2012 | Jernigan et al. |
| 8,190,741 B2 | 5/2012 | Wong et al. |
| 8,249,885 B2 | 8/2012 | Berkowitz et al. |
| 8,250,397 B2 | 8/2012 | Marcy et al. |
| 8,260,742 B2 | 9/2012 | Cognigni et al. |
| 8,301,994 B1 | 10/2012 | Shah et al. |
| 8,312,242 B2 | 11/2012 | Casper et al. |
| 8,326,874 B2 | 12/2012 | Wright et al. |
| 8,359,467 B2 | 1/2013 | Subramanian et al. |
| 8,417,676 B2 | 4/2013 | Petri |
| 8,548,992 B2 | 10/2013 | Abramoff et al. |
| 8,554,800 B2 | 10/2013 | Goldentouch |
| 8,589,349 B2 | 11/2013 | Grant et al. |
| 8,661,070 B2 | 2/2014 | Goldsmith et al. |
| 8,667,034 B1 | 3/2014 | Simon et al. |
| 8,694,564 B2 | 4/2014 | Guarraci |
| 8,700,670 B2 | 4/2014 | Marathe et al. |
| 8,706,701 B1 | 4/2014 | Stefanov et al. |
| 8,818,951 B1 | 8/2014 | Muntz et al. |
| 8,862,644 B2 | 10/2014 | Lyle et al. |
| 8,880,474 B2 | 11/2014 | Mason et al. |
| 8,904,503 B2 | 12/2014 | Agbabian |

(56) References Cited

U.S. PATENT DOCUMENTS

| | | |
|---|---|---|
| 8,990,924 B2 | 3/2015 | Chow |
| 8,996,884 B2 | 3/2015 | Hartley |
| 9,002,805 B1 | 4/2015 | Barber et al. |
| 9,087,215 B2 | 7/2015 | LaFever et al. |
| 9,129,088 B1 | 9/2015 | Baschy |
| 9,152,466 B2 | 10/2015 | Dictos et al. |
| 9,210,116 B2 | 12/2015 | Jeng et al. |
| 9,218,429 B2 | 12/2015 | Levy |
| 9,231,988 B2 | 1/2016 | Holt et al. |
| 9,239,841 B2 | 1/2016 | Amaudov et al. |
| 9,251,235 B1 | 2/2016 | Hurst et al. |
| 9,294,485 B2 | 3/2016 | Allain et al. |
| 9,298,384 B2 | 3/2016 | Kang et al. |
| 9,300,609 B1 | 3/2016 | Beausoleil et al. |
| 9,310,981 B2 | 4/2016 | Lynch et al. |
| 9,311,324 B2 | 4/2016 | Irizarry, Jr. |
| 9,325,571 B2 | 4/2016 | Chen |
| 9,330,106 B2 | 5/2016 | Piasecki et al. |
| 9,336,219 B2 | 5/2016 | Makkar et al. |
| 9,361,473 B2 | 6/2016 | Chou Fritz et al. |
| 9,413,708 B1 | 8/2016 | Michael et al. |
| 9,424,437 B1 | 8/2016 | Ancin et al. |
| 9,426,216 B2 | 8/2016 | Subramani et al. |
| 9,430,669 B2 | 8/2016 | Staley et al. |
| 9,432,457 B2 | 8/2016 | Marano et al. |
| 9,444,869 B2 | 9/2016 | Jellison, Jr. et al. |
| 9,448,893 B1 | 9/2016 | Whitehead et al. |
| 9,449,082 B2 | 9/2016 | Leonard |
| 9,449,182 B1 | 9/2016 | Dang et al. |
| 9,454,534 B2 | 9/2016 | Thomas et al. |
| 9,471,807 B1 | 10/2016 | Chakraborty et al. |
| 9,477,673 B2 | 10/2016 | Dwan et al. |
| 9,479,567 B1 | 10/2016 | Koorapati et al. |
| 9,479,578 B1 | 10/2016 | Swanson |
| 9,483,491 B2 | 11/2016 | Wijayaratne et al. |
| 9,495,478 B2 | 11/2016 | Hendrickson et al. |
| 9,501,490 B2 | 11/2016 | Evans et al. |
| 9,507,795 B2 | 11/2016 | Dorman et al. |
| 9,529,818 B2 | 12/2016 | Catmull et al. |
| 9,542,404 B2 | 1/2017 | Moore et al. |
| 9,547,559 B2 | 1/2017 | Whitehead et al. |
| 9,552,363 B2 | 1/2017 | Novak et al. |
| 9,558,202 B2 | 1/2017 | Lockhart et al. |
| 9,563,638 B2 | 2/2017 | Newhouse |
| 9,565,227 B1 | 2/2017 | Helter et al. |
| 9,589,131 B2 | 3/2017 | Austin |
| 9,596,246 B2 | 3/2017 | Peddada |
| 9,614,826 B1 | 4/2017 | McCorkendale |
| 9,632,528 B2 | 4/2017 | Miyashita et al. |
| 9,633,037 B2 | 4/2017 | Smith et al. |
| 9,648,088 B1 | 5/2017 | Pande et al. |
| 9,652,490 B2 | 5/2017 | Belanger et al. |
| 9,652,741 B2 | 5/2017 | Goldberg et al. |
| 9,672,261 B2 | 6/2017 | Holmes-Higgin et al. |
| 9,703,801 B2 | 7/2017 | Melahn et al. |
| 9,710,535 B2 | 7/2017 | Aizman et al. |
| 9,716,753 B2 | 7/2017 | Piyush et al. |
| 9,720,926 B2 | 8/2017 | Aron et al. |
| 9,720,947 B2 | 8/2017 | Aron et al. |
| 9,727,394 B2 | 8/2017 | Xun et al. |
| 9,747,164 B1 | 8/2017 | Auchmoody et al. |
| 9,747,297 B2 | 8/2017 | Penangwala et al. |
| 9,754,119 B1 | 9/2017 | Kilday |
| 9,767,106 B1 | 9/2017 | Duggal et al. |
| 9,773,051 B2 | 9/2017 | Smith |
| 9,805,050 B2 | 10/2017 | Smith et al. |
| 9,805,054 B2 | 10/2017 | Davis et al. |
| 9,805,106 B2 | 10/2017 | McErlean et al. |
| 9,817,987 B2 | 11/2017 | Mityagin |
| 9,824,090 B2 | 11/2017 | Hayrapetian et al. |
| 9,830,345 B1 | 11/2017 | Baars |
| 9,838,424 B2 | 12/2017 | Brady et al. |
| 9,953,036 B2 | 4/2018 | Mackenzie et al. |
| 10,013,440 B1 | 7/2018 | Gupta et al. |
| 10,037,339 B1 | 7/2018 | Kleinpeter et al. |
| 10,235,378 B1 | 3/2019 | Mamidi et al. |
| 10,324,903 B1 | 6/2019 | Goldberg et al. |
| 10,380,076 B2 | 8/2019 | Wijayaratne et al. |
| 2003/0145020 A1 | 7/2003 | Ngo et al. |
| 2003/0196119 A1 | 10/2003 | Raley et al. |
| 2004/0002990 A1 | 1/2004 | Sander et al. |
| 2004/0098418 A1 | 5/2004 | Hein |
| 2004/0255048 A1 | 12/2004 | Lev et al. |
| 2005/0125411 A1 | 6/2005 | Kilian et al. |
| 2005/0144308 A1 | 6/2005 | Harashima et al. |
| 2005/0149450 A1 | 7/2005 | Stefik et al. |
| 2005/0198385 A1 | 9/2005 | Aust et al. |
| 2005/0256861 A1 | 11/2005 | Wong et al. |
| 2005/0289446 A1 | 12/2005 | Moncsko et al. |
| 2006/0070114 A1 | 3/2006 | Wood et al. |
| 2006/0136513 A1 | 6/2006 | Ngo et al. |
| 2006/0155776 A1 | 7/2006 | Aust |
| 2006/0184720 A1 | 8/2006 | Sinclair et al. |
| 2006/0253501 A1 | 11/2006 | Langan et al. |
| 2007/0016650 A1 | 1/2007 | Gilbert et al. |
| 2007/0067349 A1 | 3/2007 | Jhaveri et al. |
| 2007/0088764 A1 | 4/2007 | Yoon et al. |
| 2007/0185852 A1 | 8/2007 | Erofeev |
| 2007/0198540 A1 | 8/2007 | Kohl et al. |
| 2007/0208715 A1 | 9/2007 | Muehlbauer |
| 2007/0208763 A1 | 9/2007 | Muehlbauer |
| 2007/0208948 A1 | 9/2007 | Costa-Requena et al. |
| 2007/0234398 A1 | 10/2007 | Muehlbauer |
| 2007/0282914 A1 | 12/2007 | Sivapragasam et al. |
| 2007/0283050 A1 | 12/2007 | Savage |
| 2007/0283403 A1 | 12/2007 | Eklund, II et al. |
| 2008/0104277 A1 | 5/2008 | Tian |
| 2008/0120129 A1 | 5/2008 | Seubert et al. |
| 2008/0168183 A1 | 7/2008 | Marcy et al. |
| 2009/0150569 A1 | 6/2009 | Kumar et al. |
| 2009/0182778 A1 | 7/2009 | Tormasov |
| 2009/0183117 A1 | 7/2009 | Chang |
| 2009/0198719 A1 | 8/2009 | Dewitt |
| 2009/0228511 A1 | 9/2009 | Atkin et al. |
| 2009/0271412 A1 | 10/2009 | Lacapra et al. |
| 2009/0292640 A1 | 11/2009 | Heatherly |
| 2010/0058462 A1 | 3/2010 | Chow |
| 2010/0106687 A1 | 4/2010 | Marcy et al. |
| 2011/0014985 A1 | 1/2011 | Park et al. |
| 2011/0066668 A1 | 3/2011 | Guarraci |
| 2011/0072143 A1 | 3/2011 | Kuo et al. |
| 2011/0082879 A1 | 4/2011 | Hazlewood et al. |
| 2011/0126296 A1 | 5/2011 | Moore |
| 2011/0197196 A1 | 8/2011 | Felton et al. |
| 2011/0248821 A1 | 10/2011 | Merten |
| 2011/0271084 A1 | 11/2011 | Moue et al. |
| 2012/0011098 A1 | 1/2012 | Yamada |
| 2012/0079606 A1 | 3/2012 | Evans et al. |
| 2012/0102539 A1 | 4/2012 | Robb et al. |
| 2012/0254123 A1 | 10/2012 | Ferguson et al. |
| 2012/0254505 A1 | 10/2012 | Chishtie et al. |
| 2012/0278334 A1 | 11/2012 | Abjanic |
| 2013/0013560 A1 | 1/2013 | Goldberg et al. |
| 2013/0014023 A1 | 1/2013 | Lee et al. |
| 2013/0067542 A1 | 3/2013 | Gonsalves et al. |
| 2013/0080785 A1 | 3/2013 | Ruhlen et al. |
| 2013/0133051 A1 | 5/2013 | Riemers |
| 2013/0138608 A1 | 5/2013 | Smith |
| 2013/0144834 A1 | 6/2013 | Lloyd et al. |
| 2013/0179480 A1 | 7/2013 | Agarwal et al. |
| 2013/0191339 A1 | 7/2013 | Haden et al. |
| 2013/0246527 A1 | 9/2013 | Viera |
| 2013/0254777 A1 | 9/2013 | Branson et al. |
| 2013/0258842 A1 | 10/2013 | Mizutani |
| 2013/0262862 A1 | 10/2013 | Hartley et al. |
| 2013/0268480 A1 | 10/2013 | Dorman |
| 2013/0268559 A1 | 10/2013 | Reeves |
| 2013/0282658 A1 | 10/2013 | Besen et al. |
| 2013/0282785 A1 | 10/2013 | Besen et al. |
| 2013/0290323 A1 | 10/2013 | Saib |
| 2013/0304694 A1 | 11/2013 | Barreto et al. |
| 2013/0321306 A1 | 12/2013 | Bauermeister et al. |
| 2014/0047261 A1 | 2/2014 | Patiejunas et al. |
| 2014/0059002 A1 | 2/2014 | Lockhart et al. |

(56) References Cited

U.S. PATENT DOCUMENTS

| | | |
|---|---|---|
| 2014/0082145 A1 | 3/2014 | Lacapra |
| 2014/0136635 A1 | 5/2014 | Jeng et al. |
| 2014/0143543 A1 | 5/2014 | Aikas et al. |
| 2014/0173694 A1 | 6/2014 | Kranz |
| 2014/0181021 A1 | 6/2014 | Montulli et al. |
| 2014/0181033 A1 | 6/2014 | Pawar et al. |
| 2014/0181053 A1 | 6/2014 | Belanger et al. |
| 2014/0181579 A1 | 6/2014 | Whitehead et al. |
| 2014/0188798 A1 | 7/2014 | MacKenzie et al. |
| 2014/0189051 A1 | 7/2014 | Hunter |
| 2014/0189118 A1 | 7/2014 | Hunter |
| 2014/0189355 A1 | 7/2014 | Hunter |
| 2014/0195485 A1 | 7/2014 | Dorman |
| 2014/0195638 A1* | 7/2014 | Houston ............ H04L 67/1097 709/217 |
| 2014/0201138 A1 | 7/2014 | Dorman et al. |
| 2014/0201145 A1 | 7/2014 | Dorman et al. |
| 2014/0250066 A1 | 9/2014 | Calkowski et al. |
| 2014/0258350 A1 | 9/2014 | Duval et al. |
| 2014/0258418 A1 | 9/2014 | Subramani et al. |
| 2014/0282851 A1 | 9/2014 | Miller et al. |
| 2014/0289195 A1 | 9/2014 | Chan et al. |
| 2014/0297734 A1 | 10/2014 | Lacapra |
| 2014/0310175 A1 | 10/2014 | Coronel |
| 2014/0372376 A1 | 12/2014 | Smith et al. |
| 2014/0379647 A1 | 12/2014 | Smith et al. |
| 2015/0012616 A1 | 1/2015 | Pearl et al. |
| 2015/0026222 A1 | 1/2015 | Litzenberger |
| 2015/0026597 A1 | 1/2015 | Gadamsetty et al. |
| 2015/0026604 A1 | 1/2015 | Mulukuri et al. |
| 2015/0026751 A1 | 1/2015 | Yokoi |
| 2015/0058932 A1 | 2/2015 | Faitelson et al. |
| 2015/0088817 A1 | 3/2015 | Dwan et al. |
| 2015/0089019 A1 | 3/2015 | Chou |
| 2015/0100546 A1 | 4/2015 | Eberlein et al. |
| 2015/0100547 A1 | 4/2015 | Holmes-Higgin et al. |
| 2015/0100705 A1 | 4/2015 | Abe et al. |
| 2015/0134600 A1 | 5/2015 | Eisner et al. |
| 2015/0154418 A1 | 6/2015 | Redberg |
| 2015/0163206 A1 | 6/2015 | McCarthy et al. |
| 2015/0172283 A1 | 6/2015 | Omnes et al. |
| 2015/0172412 A1 | 6/2015 | Escriva et al. |
| 2015/0186668 A1 | 7/2015 | Whaley et al. |
| 2015/0193347 A1 | 7/2015 | Kluesing et al. |
| 2015/0207844 A1 | 7/2015 | Tataroiu et al. |
| 2015/0220917 A1 | 8/2015 | Aabye et al. |
| 2015/0222431 A1 | 8/2015 | Guido Van Rossum |
| 2015/0222580 A1 | 8/2015 | Grue |
| 2015/0222615 A1 | 8/2015 | Allain et al. |
| 2015/0242521 A1 | 8/2015 | Hunter |
| 2015/0244692 A1 | 8/2015 | Liu et al. |
| 2015/0244795 A1 | 8/2015 | Cantwell et al. |
| 2015/0248384 A1 | 9/2015 | Luo et al. |
| 2015/0277802 A1 | 10/2015 | Oikarinen et al. |
| 2015/0277969 A1 | 10/2015 | Strauss et al. |
| 2015/0278024 A1 | 10/2015 | Barman et al. |
| 2015/0278397 A1 | 10/2015 | Hendrickson et al. |
| 2015/0280959 A1 | 10/2015 | Vincent |
| 2015/0281360 A1 | 10/2015 | Lacapra |
| 2015/0296012 A1 | 10/2015 | Piyush et al. |
| 2015/0310035 A1 | 10/2015 | Godman et al. |
| 2015/0318941 A1 | 11/2015 | Zheng et al. |
| 2015/0356111 A1 | 12/2015 | Kalsi et al. |
| 2015/0358408 A1 | 12/2015 | Fukatani et al. |
| 2015/0370483 A1 | 12/2015 | Schoebel-Theuer |
| 2015/0370825 A1 | 12/2015 | Outcalt et al. |
| 2016/0028796 A1 | 1/2016 | Garcia et al. |
| 2016/0034508 A1 | 2/2016 | Aron et al. |
| 2016/0036822 A1 | 2/2016 | Kim et al. |
| 2016/0050177 A1 | 2/2016 | Cue et al. |
| 2016/0065672 A1 | 3/2016 | Savage et al. |
| 2016/0085769 A1 | 3/2016 | Penangwala et al. |
| 2016/0092312 A1 | 3/2016 | Dornquast et al. |
| 2016/0103750 A1 | 4/2016 | Cooper et al. |
| 2016/0110374 A1 | 4/2016 | Wetherall et al. |
| 2016/0112508 A1 | 4/2016 | Sher |
| 2016/0140197 A1 | 5/2016 | Gast et al. |
| 2016/0182494 A1 | 6/2016 | Lissounov et al. |
| 2016/0188465 A1 | 6/2016 | Almasi et al. |
| 2016/0188628 A1 | 6/2016 | Hartman et al. |
| 2016/0205100 A1 | 7/2016 | Brannon |
| 2016/0210238 A1 | 7/2016 | Frank et al. |
| 2016/0224989 A1 | 8/2016 | Lissounov et al. |
| 2016/0285890 A1 | 9/2016 | Beausoleil et al. |
| 2016/0291856 A1 | 10/2016 | von Muhlen et al. |
| 2016/0292179 A1* | 10/2016 | von Muhlen ......... G06F 16/178 |
| 2016/0292443 A1 | 10/2016 | von Muhlen et al. |
| 2016/0294916 A1 | 10/2016 | Daher et al. |
| 2016/0301619 A1 | 10/2016 | Bashir et al. |
| 2016/0308950 A1 | 10/2016 | Bouvrette et al. |
| 2016/0321287 A1 | 11/2016 | Luthra et al. |
| 2016/0321293 A1 | 11/2016 | Auer |
| 2016/0323358 A1 | 11/2016 | Malhotra et al. |
| 2016/0334967 A1 | 11/2016 | Rottler et al. |
| 2016/0335278 A1 | 11/2016 | Tabaaloute et al. |
| 2016/0337356 A1 | 11/2016 | Simon et al. |
| 2016/0342479 A1 | 11/2016 | Chen et al. |
| 2016/0349999 A1 | 12/2016 | Adler et al. |
| 2016/0352752 A1 | 12/2016 | Bush et al. |
| 2016/0353447 A1 | 12/2016 | White et al. |
| 2016/0357720 A1 | 12/2016 | Thimbleby |
| 2016/0366118 A1 | 12/2016 | Wang |
| 2016/0371296 A1 | 12/2016 | Passey et al. |
| 2016/0371358 A1 | 12/2016 | Lee et al. |
| 2017/0005974 A1 | 1/2017 | Wheeler et al. |
| 2017/0006097 A1 | 1/2017 | Johnson |
| 2017/0026379 A1 | 1/2017 | Lu et al. |
| 2017/0039216 A1 | 2/2017 | Fan et al. |
| 2017/0052717 A1 | 2/2017 | Rawat et al. |
| 2017/0075920 A1 | 3/2017 | Mckay |
| 2017/0075921 A1 | 3/2017 | Benton et al. |
| 2017/0078383 A1 | 3/2017 | Murstein et al. |
| 2017/0078384 A1 | 3/2017 | Trandafir et al. |
| 2017/0109385 A1 | 4/2017 | Aronovich et al. |
| 2017/0123931 A1 | 5/2017 | Aizman et al. |
| 2017/0124111 A1 | 5/2017 | Sharma et al. |
| 2017/0131934 A1 | 5/2017 | Kaczmarczyk et al. |
| 2017/0149885 A1 | 5/2017 | Kaplan et al. |
| 2017/0177613 A1 | 6/2017 | Sharma et al. |
| 2017/0185687 A1 | 6/2017 | Pai et al. |
| 2017/0192656 A1 | 7/2017 | Pedrick et al. |
| 2017/0192856 A1 | 7/2017 | Chin et al. |
| 2017/0192998 A1 | 7/2017 | Sergeev et al. |
| 2017/0193002 A1 | 7/2017 | Shvachko et al. |
| 2017/0193040 A1 | 7/2017 | Agrawal et al. |
| 2017/0193448 A1 | 7/2017 | Piyush et al. |
| 2017/0195457 A1 | 7/2017 | Smith, II et al. |
| 2017/0220596 A1 | 8/2017 | Smith et al. |
| 2017/0230702 A1 | 8/2017 | Sarosi et al. |
| 2017/0235759 A1 | 8/2017 | Altaparmakov et al. |
| 2017/0270136 A1 | 9/2017 | Chen et al. |
| 2017/0270306 A1 | 9/2017 | Dorwin |
| 2017/0289210 A1 | 10/2017 | Pai et al. |
| 2017/0302737 A1 | 10/2017 | Piyush et al. |
| 2017/0308443 A1 | 10/2017 | Lai et al. |
| 2017/0308565 A1 | 10/2017 | Broll et al. |
| 2017/0308598 A1 | 10/2017 | Goldberg et al. |
| 2017/0308599 A1 | 10/2017 | Newhouse |
| 2017/0308681 A1 | 10/2017 | Gould et al. |
| 2017/0314898 A1 | 11/2017 | Syverson et al. |
| 2017/0331893 A1 | 11/2017 | Crofton et al. |
| 2017/0351701 A1 | 12/2017 | Aron et al. |
| 2017/0357663 A1 | 12/2017 | Giampaolo |
| 2018/0004442 A1 | 1/2018 | Hnanicek et al. |
| 2018/0084045 A1 | 3/2018 | Nichols et al. |
| 2018/0089349 A1 | 3/2018 | Rezgui |
| 2018/0144263 A1 | 5/2018 | Saxena et al. |
| 2018/0150477 A1 | 5/2018 | Jewell et al. |
| 2018/0176082 A1 | 6/2018 | Katz et al. |
| 2018/0176093 A1 | 6/2018 | Katz et al. |
| 2018/0176120 A1 | 6/2018 | Katz et al. |
| 2018/0181549 A1 | 6/2018 | Hileman et al. |
| 2018/0196643 A1 | 7/2018 | Dolby et al. |
| 2018/0246946 A1 | 8/2018 | Sadhwani |

(56) References Cited

U.S. PATENT DOCUMENTS

| | | | |
|---|---|---|---|
| 2018/0364950 | A1 | 12/2018 | Spillane et al. |
| 2018/0365236 | A1 | 12/2018 | Wang et al. |
| 2019/0005139 | A1 | 1/2019 | Ford et al. |
| 2019/0034507 | A1 | 1/2019 | Duttagupta et al. |
| 2019/0050833 | A1 | 2/2019 | Hu et al. |
| 2019/0102370 | A1 | 4/2019 | Nelson et al. |
| 2019/0114427 | A1 | 4/2019 | Suryanarayana et al. |
| 2019/0179714 | A1 | 6/2019 | Karthikeyan et al. |
| 2019/0205423 | A1 | 7/2019 | Haven et al. |
| 2019/0205424 | A1 | 7/2019 | Jubb, IV |
| 2019/0205425 | A1 | 7/2019 | Goldberg et al. |
| 2019/0332231 | A1 | 10/2019 | Rogers et al. |
| 2019/0332688 | A1 | 10/2019 | Valentine |
| 2019/0361793 | A1 | 11/2019 | Goldberg |

FOREIGN PATENT DOCUMENTS

| | | | |
|---|---|---|---|
| CN | 106897352 | A | 6/2017 |
| CN | 106941504 | A | 7/2017 |
| EP | 2757491 | A1 | 7/2014 |
| EP | 2911068 | A1 | 8/2015 |
| GB | 2399663 | A | 9/2004 |
| GB | 2494047 | A | 2/2013 |
| WO | 2009126941 | A1 | 10/2009 |
| WO | 2014080547 | A1 | 5/2014 |
| WO | 2015055035 | A1 | 4/2015 |

OTHER PUBLICATIONS

Non-Final Office Action from U.S. Appl. No. 15/858,110, dated Feb. 24, 2020, 13 pages.
Non-Final Office Action from U.S. Appl. No. 15/863,815, dated Mar. 18, 2020, 17 pages.
Non-Final Office Action from U.S. Appl. No. 15/867,571, dated Feb. 26, 2020, 28 pages.
Notice of Allowance from U.S. Appl. No. 15/863,819, dated Mar. 6, 2020, 10 pages.
Notice of Allowance from U.S. Appl. No. 15/868,489, dated Feb. 20, 2020, 2 pages.
Notice of Allowance from U.S. Appl. No. 15/870,221, dated Feb. 25, 2020, 19 pages.
Chang Liu, Xin Ye and En Ye, "Source Code Revision History Visualization Tools: Do They Work and What Would It Take to Put Them to Work?", IEEE Access, vol. 2, 2014, published May 6, 2014, pp. 404-426.
Non-Final Office Action from U.S. Appl. No. 15/858,125, dated Dec. 31, 2019, 12 pages.
Non-Final Office Action from U.S. Appl. No. 15/858,207, dated Jan. 22, 2020, 15 pages.
Non-Final Office Action from U.S. Appl. No. 15/858,357, dated Jan. 7, 2020, 15 pages.
Notice of Allowance from U.S. Appl. No. 15/868,489, dated Jan. 24, 2020, 2 pages.
Notice of Allowance from U.S. Appl. No. 15/870,221, dated Jan. 17, 2020, 22 pages.
Notice of Allowance from U.S. Appl. No. 15/873,693, dated Jan. 30, 2020, 5 pages.
Kristal T. Pollack and Scott Brandt, "Efficient Access Control for Distributed Hierarchical File Systems." Source: Proceedings—Twenty-second IEEE/Thirteenth NASA Goddard Conference on Mass Storage Systems and Technologies, IEEE/NASA MSST2005, Apr. 11, 2005-Apr. 14, 2005, pp. 253-260.
"CentreStack", Gladinet, Inc., Boca Raton, FL, May 30, 2015 (Available online at https://webcache.googleusercontent.com/search?q=cache:R3ogLpu7xJYJ:https://www.gladinet.com/library/admin/index.htm+&cd=1&hl=en&ct=clnk&gl=us, last visited Feb. 8, 2018).
Salman Niazi et al., "HopsFS: Scaling Hierarchical File System Metadata Using NewSQL Databases," The 15th USENIX Conference on File and Storage Technologies (FAST 17) (2017), pp. 89-104, Submitted on Jun. 6, 2016 (v1), last revised Feb. 22, 2017 (this version, v2)).

Uploaded by Neeraj Singh, Distributed System Answer Key, (Available online at https://www.scribd.com/doc/80052663/Distributed-System-Answer-Key).
V. Swathy et al., "Providing Advanced Security Mechanism for Scalable Data Sharing in Cloud Storage," 2016 International Conference on Inventive Computation Technologies (ICICT), 2016, vol. 3, pp. 1-6.
Final Office Action from U.S. Appl. No. 15/863,748, dated Dec. 20, 2019, 19 pages.
Non-Final Office Action from U.S. Appl. No. 15/858,410, dated Nov. 29, 2019, 14 pages.
Non-Final Office Action from U.S. Appl. No. 15/858,430, dated Nov. 26, 2019, 10 pages.
Non-Final Office Action from U.S. Appl. No. 15/863,751, dated Nov. 6, 2019, 17 pages.
Non-Final Office Action from U.S. Appl. No. 15/867,496, dated Nov. 13, 2019, 12 pages.
Non-Final Office Action from U.S. Appl. No. 15/868,505, dated Nov. 14, 2019, 7 pages.
Non-Final Office Action from U.S. Appl. No. 15/870,179, dated Oct. 7, 2019, 6 pages.
Notice of Allowance from U.S. Appl. No. 15/868,489, dated Dec. 27, 2019, 2 pages.
Notice of Allowance from U.S. Appl. No. 15/873,693, dated Dec. 26, 2019, 9 pages.
Notice of Allowance from U.S. Appl. No. 15/873,693, dated Oct. 29, 2019, 10 pages.
International Search Report and Written Opinion for PCT Application PCT/US2018/064659 dated Mar. 19, 2019, 13 pages.
International Search Report and Written Opinion for PCT Application PCT/US2018/064670 dated Mar. 14, 2019, 13 pages.
International Search Report and Written Opinion for PCT Application PCT/US2018/064675 dated Mar. 13, 2019, 12 pages.
International Search Report and Written Opinion for PCT Application PCT/US2018/065091 dated Mar. 21, 2019, 16 pages.
International Search Report and Written Opinion for PCT Application PCT/US2018/065100 dated Mar. 19, 2019, 11 pages.
International Search Report and Written Opinion for PCT Application PCT/US2018/065352 dated Mar. 19, 2019, 13 pages.
International Search Report and Written Opinion for PCT Application PCT/US2018/065940 dated Mar. 14, 2019, 14 pages.
International Search Report and Written Opinion for PCT Application PCT/US2018/066193 dated Mar. 14, 2019, 12 pages.
Cobena G., et al., "Detecting Changes in XML Documents," Proceedings of the 18th International Conference on Data Engineering, Jan. 1, 2002, pp. 41-52.
International Search Report and Written Opinion for PCT Application PCT/US2018/065097 dated Mar. 19, 2019, 14 pages.
International Search Report and Written Opinion for PCT Application PCT/US2018/065347 dated Apr. 2, 2019, 16 pages.
Lindholm T., et al., "A Hybrid Approach to Optimistic File System Directory Tree Synchronization," MobiDE 2005, Proceedings of 4th ACM International Workshop on Data Engineering for Wireless and Mobile Access, Jun. 12, 2005, pp. 49-56.
Lindholm T., "XML Three-way Merge as a Reconciliation Engine for Mobile Data," Proceedings of the 3rd ACM International Workshop on Data Engineering for Wireless and Mobile Access, MobiDE'03, Sep. 19, 2003, pp. 93-97.
Phan R.C.W., et al., "Security Considerations for Incremental Hash Functions Based on Pair Block Chaining," Computers & Security, vol. 25 (2), Jan. 30, 2006, pp. 131-136.
Wang Y., et al., "X-Diff: An Effective Change Detection Algorithm for XML Documents," 2003 IEEE, Proceedings of the 19th International Conference on Data Engineering (ICDE'03), Mar. 5-8, 2003, pp. 519-530.
Uppoor S., et al., "Cloud-based Synchronization of Distributed File System Hierarchies," 2010 IEEE International Conference on Cluster Computing Workshops and Posters (Cluster Workshops), Sep. 20, 2010, pp. 1-4.
Requirement for Restriction/Election from U.S. Appl. No. 15/858,207, dated Sep. 26, 2019, 6 pages.
Requirement for Restriction/Election from U.S. Appl. No. 15/858,410, dated Sep. 19, 2019, 7 pages.

(56) References Cited

OTHER PUBLICATIONS

Final Office Action from U.S. Appl. No. 15/858,125, dated Jun. 26, 2020, 15 pages.
Final Office Action from U.S. Appl. No. 15/858,207, dated Jul. 2, 2020, 16 pages.
Final Office Action from U.S. Appl. No. 15/858,430, dated Jun. 12, 2020, 11 pages.
Kappes G., et al., "Virtualization-aware Access Control for Multitenant Filesystems," MSST 2014, Jun. 2-6, 2014, pp. 1-6.
Mell P M., et al., "Linear Time Algorithms to Restrict Insider Access using Multi-Policy Access Control Systems," Apr. 2013, retrieved from https://www.nist.gov/publications/linear-time-algorithms-restrict-insider-access-using-multi-policy-access-control, on Dec. 31, 2019, 2 Pages.
Non-Final Office Action from U.S. Appl. No. 15/857,713, dated Jan. 7, 2020, 16 pages.
Non-Final Office Action from U.S. Appl. No. 15/858,192, dated Jun. 12, 2020, 13 pages.
Non-Final Office Action from U.S. Appl. No. 15/863,751, dated Jul. 7, 2020, 16 pages.
Notice of Allowance from U.S. Appl. No. 15/870,179, dated Jun. 11, 2020, 7 pages.
Wolff D, "A Web-Based Tool for Managing the Submission of Student Work," Journal of Computing Sciences in Colleges, Dec. 2004, vol. 20 (2), pp. 144-153.
Final Office Action from U.S. Appl. No. 15/863,751, dated Mar. 24, 2020, 16 pages.
Non-Final Office Action from U.S. Appl. No. 15/858,146, dated Apr. 1, 2020, 23 pages.
Non-Final Office Action from U.S. Appl. No. 15/867,486, dated Apr. 3, 2020, 36 pages.
Notice of Allowance from U.S. Appl. No. 15/863,819, dated Apr. 7, 2020, 8 pages.
Advisory Action from U.S. Appl. No. 15/863,748, dated Apr. 15, 2020, 3 pages.
Final Office Action from U.S. Appl. No. 15/867,496, dated Apr. 10, 2020, 14 pages.
Final Office Action from U.S. Appl. No. 15/870,179, dated Apr. 16, 2020, 6 pages.
Non-Final Office Action from U.S. Appl. No. 15/868,505, dated Apr. 13, 2020, 12 pages.
Notice of Allowance from U.S. Appl. No. 15/858,357, dated May 26, 2020, 22 pages.
Notice of Allowance from U.S. Appl. No. 15/858,410, dated May 22, 2020, 18 pages.
Notice of Allowance from U.S. Appl. No. 15/867,496, dated May 28, 2020, 10 pages.
Notice of Allowance from U.S. Appl. No. 15/870,221, dated Apr. 10, 2020, 19 pages.
Examination Report for Australian Application No. 2018395933 dated Sep. 30, 2020, 4 pages.
Final Office Action from U.S. Appl. No. 15/857,713, dated Jul. 16, 2020, 22 pages.
Final Office Action from U.S. Appl. No. 15/867,486, dated Nov. 3, 2020, 38 pages.
Final Office Action from U.S. Appl. No. 15/867,571, dated Sep. 3, 2020, 34 pages.
Final Office Action from U.S. Appl. No. 15/868,511, dated Jul. 14, 2020, 10 pages.
Non-Final Office Action from U.S. Appl. No. 15/858,207, dated Sep. 30, 2020, 20 pages.
Non-Final Office Action from U.S. Appl. No. 15/858,430, dated Oct. 6, 2020, 11 pages.
Non-Final Office Action from U.S. Appl. No. 15/863,748, dated Aug. 18, 2020, 25 pages.
Non-Final Office Action from U.S. Appl. No. 15/867,505, dated Aug. 19, 2020, 21 pages.
Notice of Allowance from U.S. Appl. No. 15/858,110, dated Sep. 3, 2020, 11 pages.
Notice of Allowance from U.S. Appl. No. 15/858,125, dated Nov. 3, 2020, 17 pages.
Notice of Allowance from U.S. Appl. No. 15/858,125, dated Sep. 9, 2020, 17 pages.
Notice of Allowance from U.S. Appl. No. 15/858,146, dated Sep. 10, 2020, 9 pages.
Notice of Allowance from U.S. Appl. No. 15/858,357, dated Aug. 18, 2020, 12 pages.
Notice of Allowance from U.S. Appl. No. 15/858,410, dated Jul. 14, 2020, 12 pages.
Notice of Allowance from U.S. Appl. No. 15/863,815, dated Sep. 30, 2020, 13 pages.
Notice of Allowance from U.S. Appl. No. 15/868,505, dated Jul. 15, 2020, 8 pages.
Notice of Allowance from U.S. Appl. No. 15/868,511, dated Sep. 16, 2020, 9 pages.
Notice of Allowance from U.S. Appl. No. 15/870,179, dated Aug. 12, 2020, 7 pages.
Chiang J.K., et al., "Authentication, Authorization and File Synchronization on Hybrid Cloud—On Case of Google Docs, Hadoop, and Linux Local Hosts", IEEE, Jul. 2-5, 2013, pp. 116-123.
Communication Pursuant to Article 94(3) EPC for European Application No. 18830580.9 dated Jan. 14, 2021, 9 pages.
Communication Pursuant to Article 94(3) EPC for European Application No. 18836962.3 dated Jan. 14, 2020, 5 pages.
Examination Report No. 1, for Australian Application No. 2018395856, dated Dec. 14, 2020, 4 pages.
Examination Report No. 1, for Australian Application No. 2018395858, dated Feb. 5, 2021, 4 pages.
Examination Report No. 1 for Australian Application No. 2018397572 dated Feb. 8, 2021, 5 pages.
Examination Report No. 1, for Australian Application No. 2018395919, dated Dec. 22, 2020, 5 pages.
Examination Report No. 1, for Australian Application No. 2018397604, dated Dec. 22, 2020, 3 pages.
Final Office Action from U.S. Appl. No. 15/863,748, dated Feb. 5, 2021, 24 pages.
Final Office Action from U.S. Appl. No. 15/863,751, dated Dec. 16, 2020, 19 pages.
Final Office Action from U.S. Appl. No. 15/867,505, dated Feb. 8, 2021, 25 pages.
Kher V., et al., "Securing Distributed Storage: Challenges, Techniques, and Systems," ACM, Nov. 2005, pp. 9-25.
Marshall C.C., et al., "Supporting Research Collaboration through Bi-Level File Synchronization," ACM, Oct. 2012, pp. 165-174.
Non-Final Office Action from U.S. Appl. No. 15/867,486, dated Feb. 5, 2021, 37 pages.
Notice of Allowance from U.S. Appl. No. 15/858,110, dated Dec. 11, 2020, 10 pages.
Notice of Allowance from U.S. Appl. No. 15/858,110, dated Jan. 6, 2021, 2 pages.
Notice of Allowance from U.S. Appl. No. 15/858,192, dated Jan. 27, 2021, 9 pages.
Notice of Allowance from U.S. Appl. No. 15/863,815, dated Jan. 21, 2021, 12 pages.
Notice of Allowance from U.S. Appl. No. 15/867,571, dated Dec. 10, 2020, 16 pages.
Notice of Allowance from U.S. Appl. No. 15/867,571, dated Jan. 19, 2021, 1 pages.
Notice of Allowance from U.S. Appl. No. 15/868,511, dated Jan. 25, 2021, 7 pages.
Wang H., et al., "On the Impact of Virtualization on Dropbox-like Cloud File Storage/Synchronization Services," IEEE, Jun. 4-5, 2012, pp. 1-9.

* cited by examiner

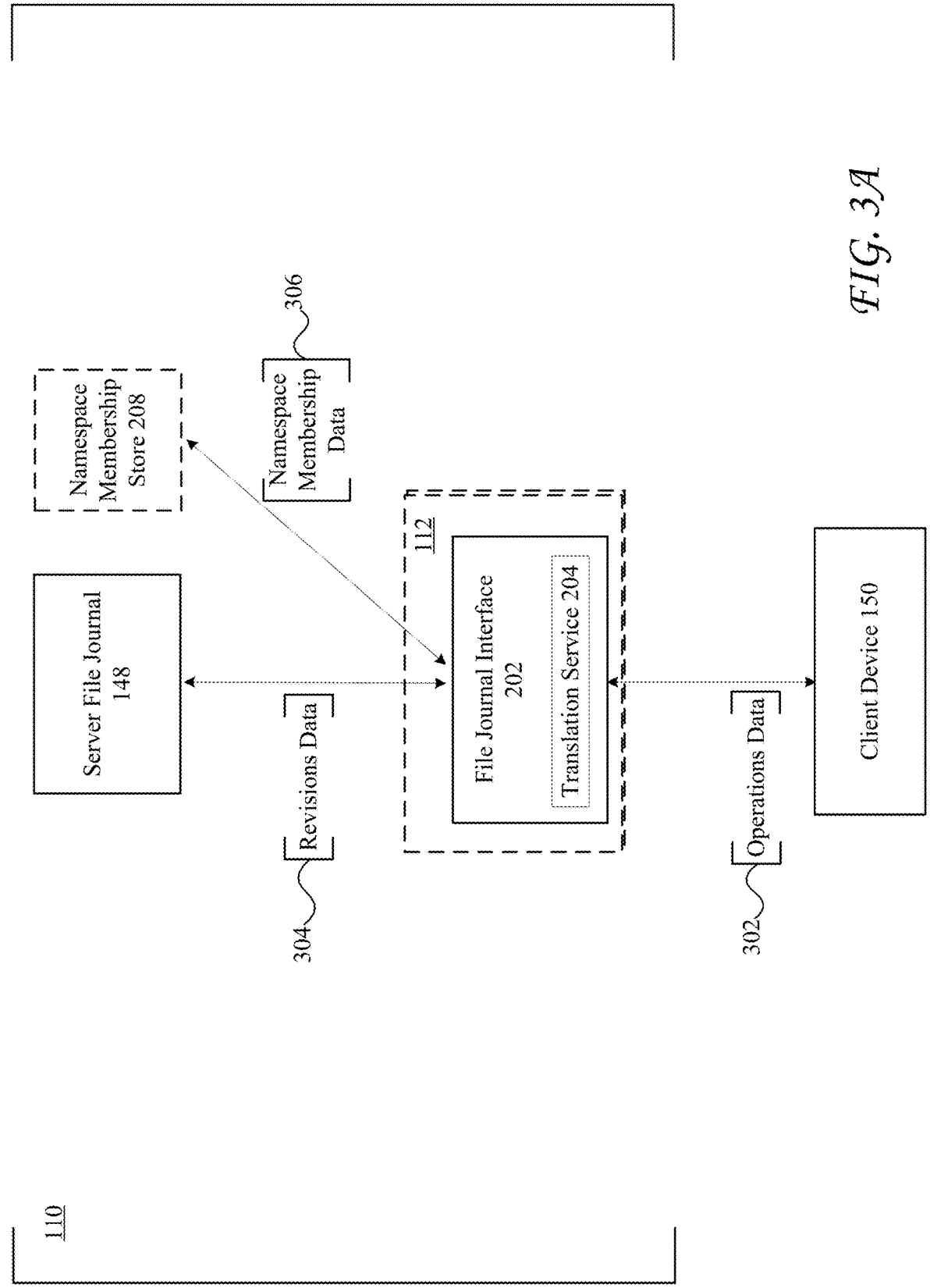

COMMIT PROTOCOL FOR SYNCHRONIZING CONTENT ITEMS

CROSS-REFERENCE TO RELATED APPLICATIONS

This application claims the benefit of U.S. provisional application No. 62/611,473, filed on Dec. 28, 2017, which is expressly incorporated by reference herein in its entirety.

TECHNICAL FIELD

The present technology pertains to distributed storage, collaboration and synchronization systems.

BACKGROUND

Cloud storage systems allow users to store and access data on the cloud. Some cloud storage systems allow users to share data with other users and access the data in a collaborative fashion. In some cases, users may also store and access local copies of the data on their client devices. The local copies of the data may provide users with faster access to the data. Additionally, the local copies can allow the user to access the data when the user is offline. Cloud storage systems may also allow users to synchronize their local copies of the data with the data on the cloud to ensure consistency. Cloud storage systems may attempt to synchronize copies of data across a number of client devices and servers so each copy of data is identical. However, synchronization of data across multiple devices can be an extremely difficult task, often resulting in undesirable loss of data and inconsistencies.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 3A shows a diagram of example communications processed by a file journal interface between a client device and a server file journal on a content management system;

DETAILED DESCRIPTION

Figure 1A:
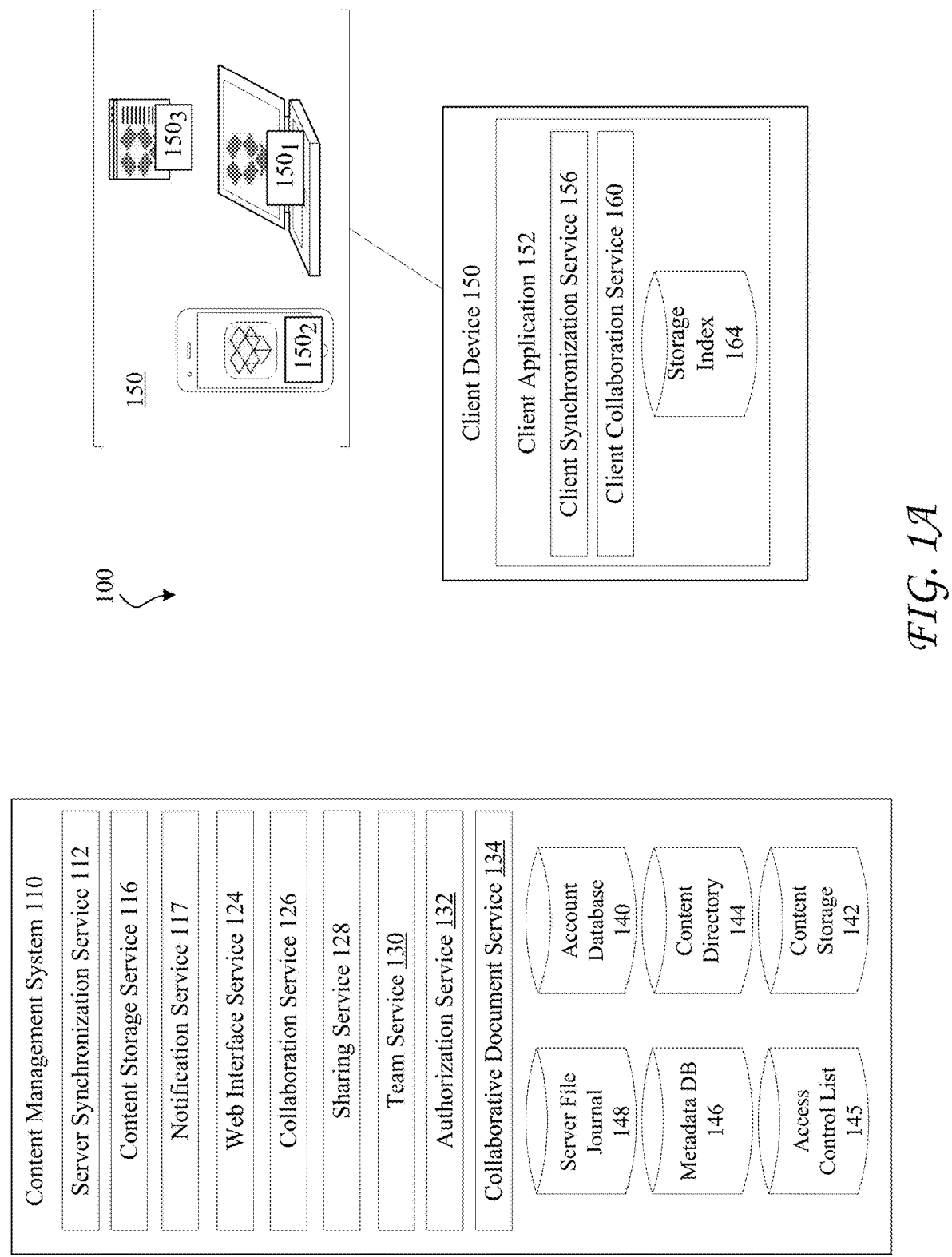
FIG. 1A shows an example of a content management system and client devices.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Cloud storage systems allow users to store and access content items across multiple devices. The content items may include, but are not limited to, files, documents, messages (e.g., email messages or text messages), media files (e.g., photos, videos, and audio files), folders, or any other unit of content. Content items may be shared with multiple users, edited, deleted, added, renamed, or moved. However, synchronizing content items shared or stored across several devices and user accounts has remained flawed and rife with technical obstacles.

To illustrate, a first machine (e.g., a client device or server) may send communications to a second machine that provides information about how a user's modification of content items on a cloud storage system. These communications may be used by the second machine to synchronize the content items on the second machine such that actions performed on content items on the first machine are reflected in content items on the second machine, and the content items on the first machine are substantially identical to the content items on the second machine.

However, in many cases, there may be several communications sent between the various machines, which may be difficult to manage. Moreover, some of the communications may be received out of order as a result of various issues, such as client or network problems. This often results in conflicts and errors between content items at the various machines. The user's activity may also generate a large number of revisions which can further complicate synchronization efforts and exacerbate inconsistencies. For example, a user may perform a large number of modifications to various content items, undo modifications in a short period of time, or quickly perform additional modifications to a previously modified content item. This increases the likelihood that changes and revisions from users are received out of order, causing outdated modifications and conflicting content items. As a result, some operations may not be compatible with the current state of the content items. Moreover, it can be extremely difficult to detect whether operations are in conflict.

There is also an inherent latency with synchronization actions. For example, actions taken on the first machine are first detected by the first machine, and a communication is then generated and transmitted through a network. The communication is received by the second machine which may still be processing previous communications, and actions detailed in the communications may be taken at the second machine. In this illustrative scenario, there are several possible points of latency, including the first machine, the second machine, and the network. As latency increases, the likelihood of conflicts between content items also increases. Processing such conflicted communications and resolving conflicts are extremely difficult and computationally expensive tasks.

Further complexity is introduced when the same or different user on the second machine or other machines with access to the content items make modifications to the content items. Additional technical issues arise when content items are modified locally and remotely in a large collaboration environment. As illustrated here, these issues can quickly multiply and grow in complexity, creating a wide array of problems and inconsistencies in the content items.

Content Management System

In some embodiments the disclosed technology is deployed in the context of a content management system having content item synchronization capabilities and collaboration features, among others. An example system configuration 100 is shown in FIG. 1A, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1A.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata database 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata database 146 can store the content path for each content item as part of a content entry.

In some embodiments the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata database 146, in association with the unique ID of the content item.

Content storage service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content storage service can provide the ability to undo operations, by using a content item version control that tracks changes to content items, different versions of content items (including diverging version trees), and a change history that can be acquired from the server file journal 148.

Content Item Synchronization

Another feature of content management system 110 is synchronization of content items with at least one client device 150. Client device(s) can take different forms and have different capabilities. For example, client device $150_1$ is a computing device having a local file system accessible by multiple applications resident thereon. Client device $150_2$ is a computing device wherein content items are only accessible to a specific application or by permission given by the specific application, and the content items are typically stored either in an application specific space or in the cloud. Client device $150_3$ is any client device accessing content management system 110 via a web browser and accessing content items via a web interface. While example client devices $150_1$, $150_2$, and $150_3$ are depicted in form factors such as a laptop, mobile device, or web browser, it should be understood that the descriptions thereof are not limited to devices of these example form factors. For example a mobile device such as client $150_2$ might have a local file system accessible by multiple applications resident thereon, or client $150_2$ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management system service 116. In some embodiments, client synchronization service 156 can perform some functions of content management system service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update server file journal 148, metadata database 146, content directory 144, content storage 142, account database 140, etc. as appropriate.

When synchronizing from content management system 110 to client device 150, a mount, modification, addition, deletion, move of a content item recorded in server file journal 148 can trigger a notification to be sent to client device 150 using notification service 117. When client device 150 is informed of the change a request changes listed in server file journal 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Team Service

In some embodiments content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Teams service 130 can provide a common shared space for the team, private user account folders, and access limited shared folders. Teams service can also provide a management interface for an administrator to manage collections and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Client Synchronization Service

Figure 1B:
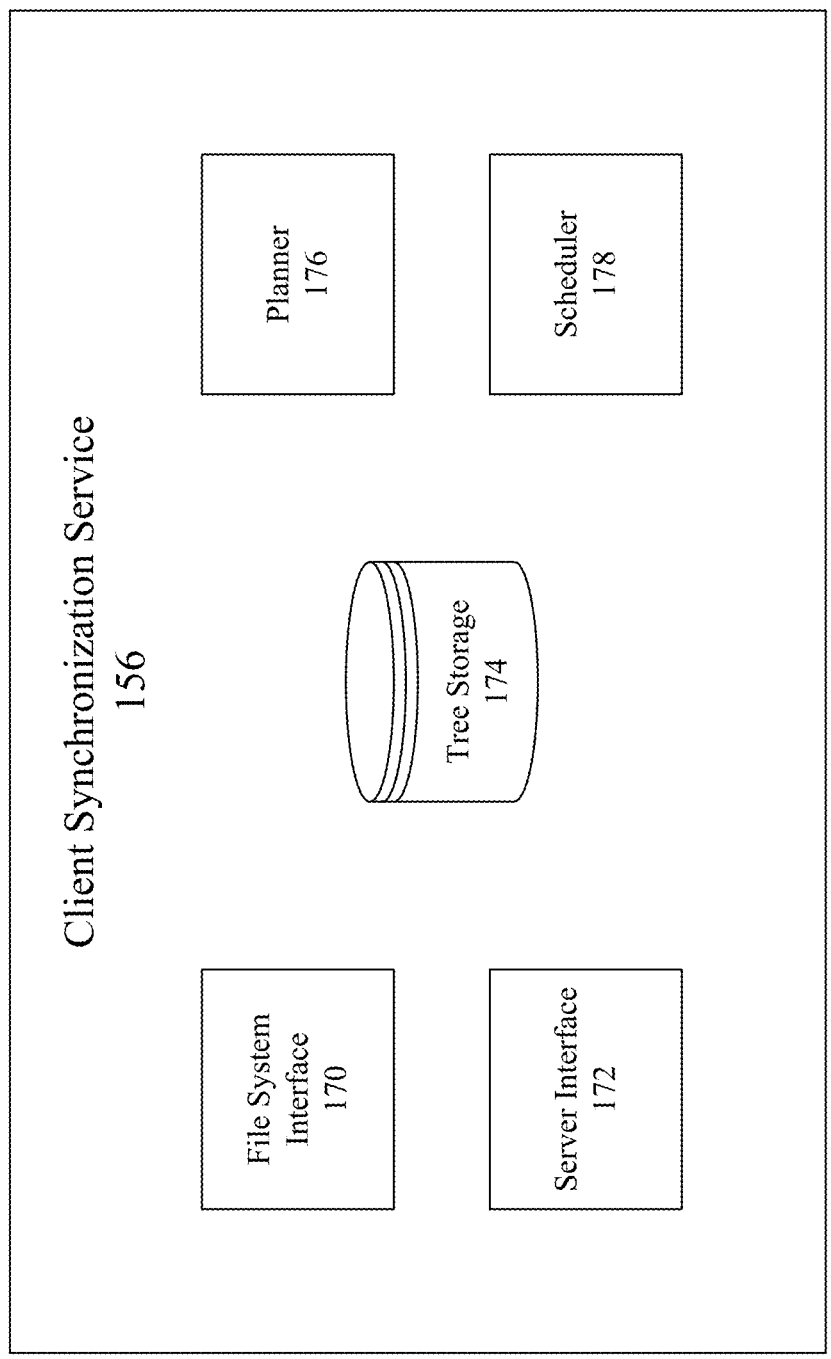
FIG. 1B shows an example of a client synchronization service in accordance with some aspects.

FIG. 1B shows an example of a client synchronization service 156, in accordance with some embodiments. According to some embodiments, client synchronization service 156 may be implemented in client device 150 shown in FIG. 1A. However, in other embodiments, client synchronization service 156 may be implemented on another computing device. Client synchronization service 156 is configured to synchronize changes to content items between a content management system and the client device on which client synchronization service 156 runs.

Client synchronization service 156 may include file system interface 170, server interface 172, tree storage 174, planner 176, and scheduler 178. Additional or alternative components may also be included. High level descriptions of client synchronization service 156 and its components are discussed below with respect to FIG. 1B. However, further details and embodiments of client synchronization service 156 and its components are discussed throughout.

File system interface 170 is configured to process changes to content items on the local filesystem of the client device and update the local tree. For example, file system interface 170 can be in communication with client synchronization service 156 to detect changes to content items on the local filesystem of the client device. Changes may also be made and detected via client application 152 of FIG. 1A. File system interface 170 may make updates to the local tree may be made based on the changes (new, deleted, modified, copied, renamed, or moved content items) to content items on the client device.

Server interface 172 is configured to aid in the processing of remote changes to content items at a remote storage of the content management system and updating of the remote tree. For example, server interface 172 can be in communication with server synchronization service 112 of FIG. 1A to synchronize changes to content items between client device 150 and content management system 110. Changes (new, deleted, modified, copied, renamed, or moved content items) to content items at content management system 110 may be detected and updates may be made to the remote tree to reflect the changes at content management system 110.

Tree storage 174 is configured to store and maintain the tree data structures used by client synchronization service 156. For example, tree storage 174 may store the local tree, the sync tree, and the remote tree. According to some embodiments, tree storage 200 may store the tree data structures in persistent memory (e.g., a hard disk or other secondary storage device) as well as in main memory (e.g., RAM or other primary storage device) in order to reduce latency and response time. For example, on start-up of the client device or client synchronization service 156, the tree data structures may be retrieved from persistent memory and loaded into main memory. Tree storage 174 may access and update the tree data structures on main memory and, before the client device or client synchronization service 156 is shut down, tree storage 174 may store the updated tree data structures on persistent memory. Because main memory is expensive in cost and often limited in size on most client devices, additional technological improvements are implemented to decrease the footprint of the tree data structures on main memory. These technological solutions are described further below.

Planner 176 is configured to detect differences between the server state associated with the content management system and the file system state associated with the client device based on the state of the tree data structures. For example, planner 176 may determine if there is a difference between the remote tree and the sync tree. A difference between the remote tree and the sync tree indicates that an action performed remotely on one or more content items stored at the content management system has caused the server state and the file system state to become out of sync. Similarly, planner 176 may also determine if there is a difference between the local tree and the sync tree. A difference between the local tree and the sync tree indicates that an action performed locally on one or more content items stored on the client device has caused the server state and the file system state to become out of sync. If a difference is detected, planner 176 generates a sequence of operations that synchronize the tree data structures.

In some scenarios, a sequence of operations generated based on a difference between the remote tree and the sync tree and a sequence of operations generated based on a difference between the local tree and the sync tree may conflict. Planner 176 is may also be configured to merge the two sequences of operations into a single merged plan of operations.

Scheduler 178 is configured to take the generated sequence of operations and manage the execution of those operations. According to some embodiments, scheduler 178 converts each operation in the sequence of operations into a series of one or more tasks that need to be executed in order to perform the operation. In some scenarios, some tasks may become out dated or no longer relevant. Scheduler 178 is configured to identify those tasks and cancel them.

Figure 2A:
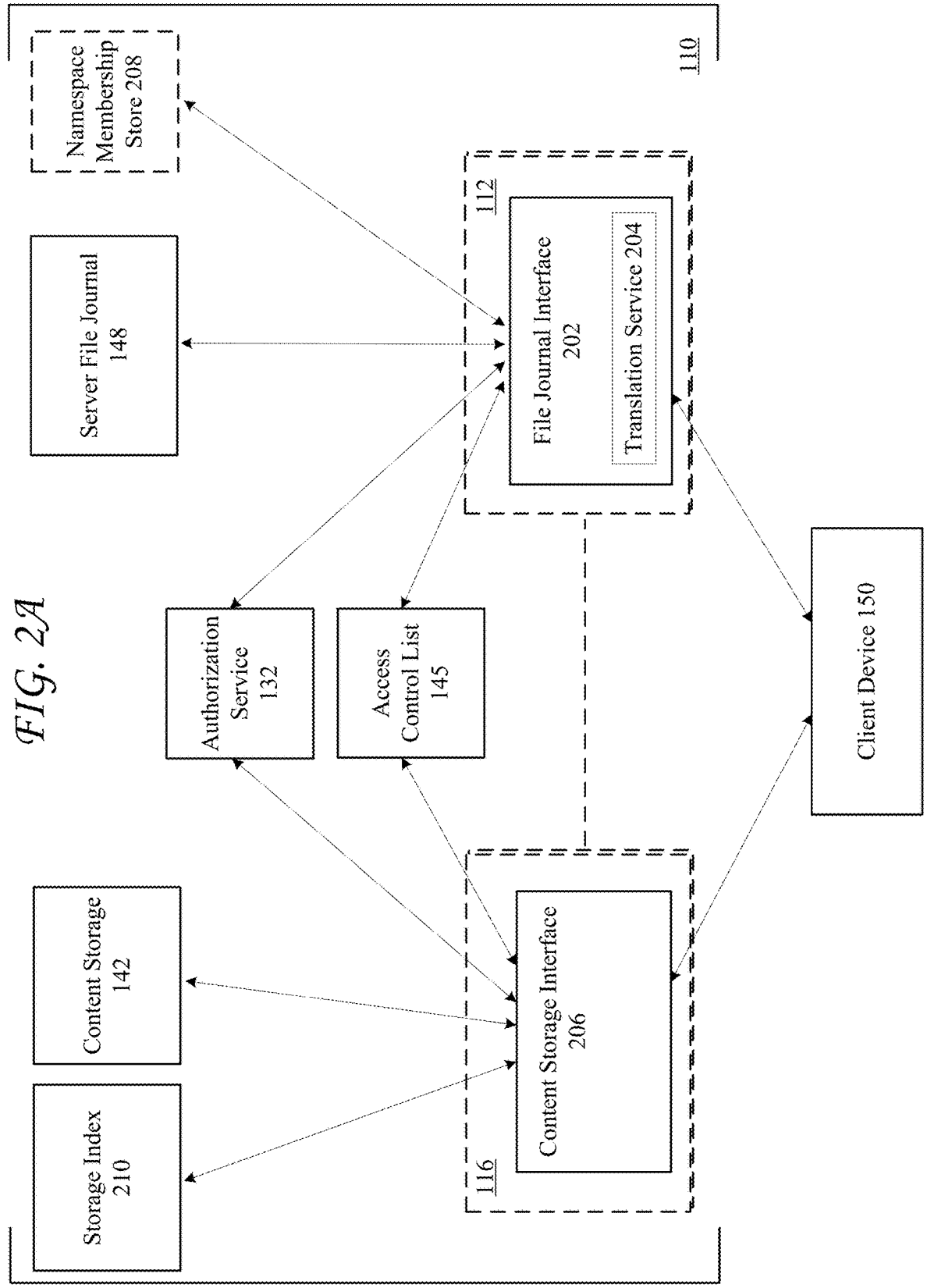
FIG. 2A shows a schematic diagram of an example architecture for synchronizing content between the content management system and client devices shown in FIG. 1A.

FIG. 2A illustrates a schematic diagram of an example architecture for synchronizing content between content management system 110 and client device 150 in system configuration 100. In this example, client device 150 interacts with content storage 142 and server file journal 148 respectively via content storage interface 206 and file journal interface 202. Content storage interface 206 can be provided or managed by content storage service 116, and file journal interface 202 can be provided or managed by server synchronization service 112. For example, content storage interface 206 can be a subcomponent or subservice of content storage service 116, and file journal interface 202 can be a subcomponent or subservice of server synchronization service 112.

Content storage interface 206 can manage communications, such as content requests or interactions, between client device 150 and content storage 142. Content storage interface 206 can process requests from client device 150 to upload and download content to and from content storage 142. Content storage interface 206 can receive content requests (e.g., downloads, uploads, etc.) from client device 150, verify permissions in access control list 145, communicate with authorization service 132 to determine if client device 150 (and/or the request from client device 150) is authorized to upload or download the content to or from content storage 142, and interact with content storage 142 to download or upload the content in content storage 142 to client device 150. If the request from client device 150 is a request to download a content item, content storage interface 206 can retrieve the content item from content storage 142 and provide the content item to client device 150. If the request from client device 150 is a request to upload a content item, content storage interface 206 can obtain the content item from client device 150 and upload the content item to content storage 142 for storage.

Figure 2B:
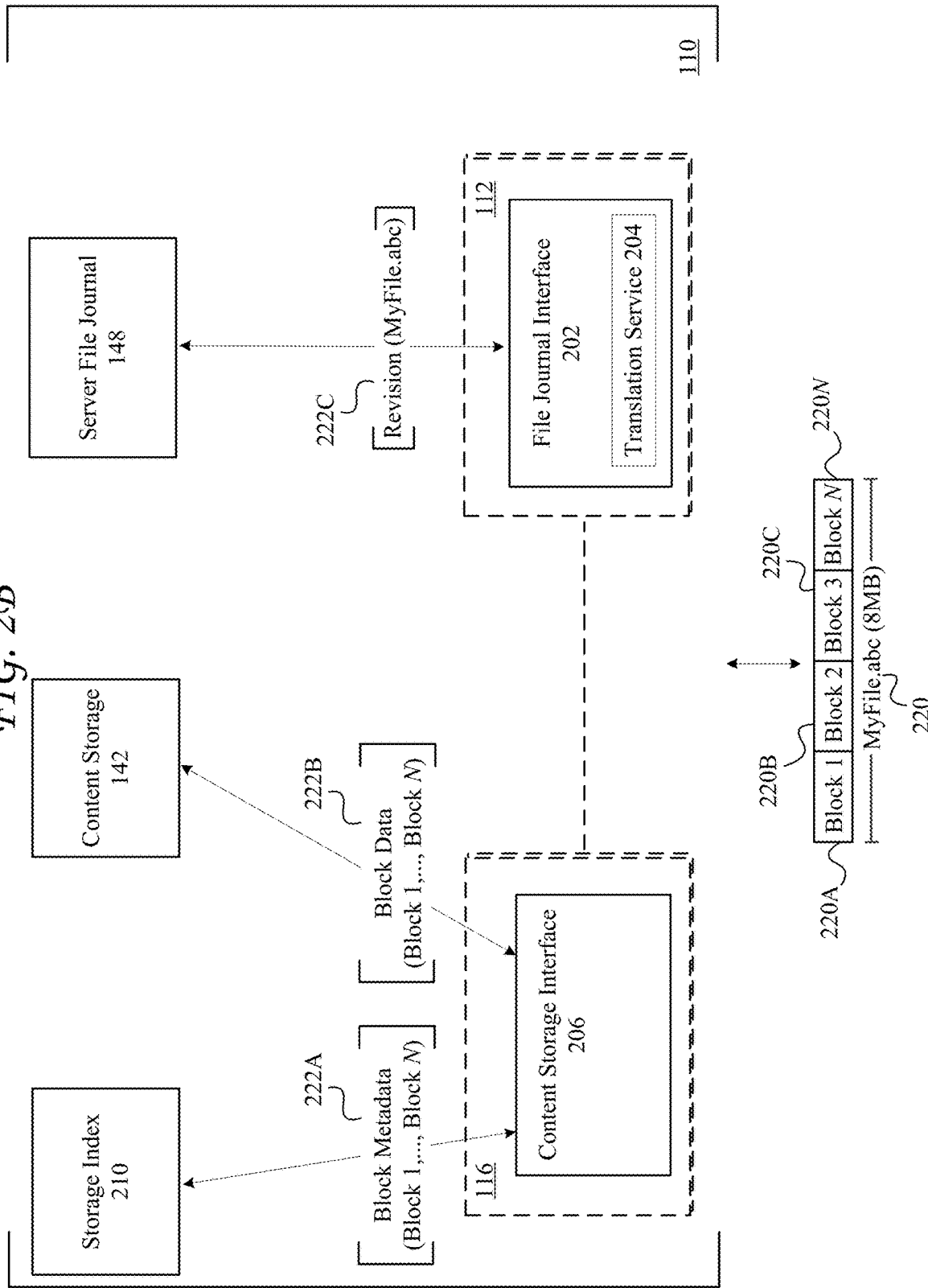
FIG. 2B shows an example configuration for storing and tracking blocks of content items in the example architecture for synchronizing content between the content management system and client devices shown in FIG. 2A.

When processing content requests from client device 150, content storage interface 206 can communicate with storage index 210 to check the availability and/or storage location of the requested content in content storage 142, and track content items in content storage 142. Storage index 210 can maintain an index of content items on content storage 142 which identifies the content items on content storage 142 and can also identify a respective location of the content items within content storage 142. Thus, storage index 210 can track content items on content storage 142 as well as storage locations of the content items. Storage index 210 can track entire content items, such as files, and/or portions of the content items, such as blocks or chunks. In some cases, content items can be split into blocks or chunks which can be stored at content storage 142 and tracked in storage index 210. For example, content storage 142 can store a content item as blocks or chunks of data which include respective data portions of the content item. Storage index 210 can track the blocks or chunks of the content item stored in content storage 142. FIG. 2B described below illustrates an example configuration for storing and tracking blocks of content items.

File journal interface 202 can manage communications, such as metadata requests and content synchronizations and operations, between client device 150 and server file journal 148. For example, file journal interface 202 can translate, validate, authenticate, and/or process operations, configurations, and state information between client device 150 and server file journal 148. File journal interface 202 can verify permissions from an FSAuth token in a cursor or through authorization service 132 to authorize, or verify authorization of, requests sent by client device 150 to server file journal 148. When processing requests or operations from client device 150, file journal interface 202 can access namespace membership store 208 to determine or verify namespace ownership information for any namespaces associated with the requests or operations from client device 150, and retrieve permissions information from access control list 145 to verify permissions of content associated with the requests or operations from client device 150.

Translation service 204 in file journal interface 202 can perform linearization and translation operations for communications between client device 150 and server file journal 148. For example, translation service 204 can translate communications from client device 150 to a different format consistent with the structure and format of data in server file journal 148, and vice versa. To illustrate, in some cases, client device 150 can process content item information (e.g., state, changes, versions, etc.) at client device 150 as operations, while server file journal 148 can process the same information as content item revisions reflected by rows in a data structure such as a database table. To enable synchronization of content item information between client device 150 and server file journal 148, translation service 204 can translate operations from client device 150 into revisions suitable for server file journal 148, and can translate revisions reflected in rows of data on server file journal 148 to operations suitable for client device 150.

In some cases, authorization service 132 can generate a token that verifies or indicates that client device 150 is authorized to access, update, download, or upload a requested content item. The token can include a device identifier associated with client device 150, an account identifier associated with a user account authenticated or authorized at client device 150, a session identifier associated with an authorized session at client device 150, a view context, and access permissions to identified collections. The token can be included in a cryptographically signed data object called a cursor, which will be described in greater detail below. Content management system 110 and/or authorization service 132 can send the token(s) to client device 150, and client device 150 can provide the token to content management system 110 when requesting content item revisions and/or updates to server file journal 148 as further described below. Client device 150 can also provide the token to content storage interface 206 to validate any content requests (e.g., downloads, uploads, etc.). Content storage interface 206 can use the token to authorize queries to storage index 210 and upload or download content items to or from content storage 142.

For example, client device 150 can send to content storage interface 206 a request to upload a content item to content storage 142. The request can include the token and the content item to be uploaded. Content storage interface 206 can use the token to authorize a query to storage index 210 to check if the content item already exists on content storage 142, and authorize the upload of the content item to content storage 142. Client device 150 can also provide the token to file journal interface 202 to authorize a request to store metadata on server file journal 148 to track the upload and revision of the content item.

FIG. 2B illustrates an example block storage and synchronization configuration. In this example, content storage 142 can store blocks of data, which can be opaque chunks of content items (e.g., files) up to a particular size (e.g., 4 MB). Content items can be split into blocks and the blocks can be stored at content storage 142 for access. Storage index 210 can track blocks stored at content storage 142, as well as the respective locations of the blocks stored at content storage 142. File journal interface 202 can interact with server file journal 148 to track revisions to the content items and/or blocks stored at content storage 142.

For example, content item 220 (e.g., MyFile.abc) can be split into blocks 220A, 220B, 220C, 220N. Content storage interface 206 can receive blocks 220A, 220B, 220C, 220N and send block data 222B to content storage 142 for storage at content storage 142. Block data 222B can include blocks 220A, 220B, 220C, 220N associated with content item 220.

Blocks 220A, 220B, 220C, 220N can be stored on one or more storage devices or volumes at content storage 142 and/or aggregated within one or more logical storage containers (e.g., buckets) or data clusters. In some cases, blocks 220A, 220B, 220C, 220N can be stored together on a same location (e.g., storage device, volume, container, and/or cluster). In other cases, some or all of blocks 220A, 220B, 220C, 220N can be stored on two or more different locations (e.g., two or more different storage devices, volumes, containers, and/or clusters).

Content storage interface 206 can also store block metadata 222A at storage index 210. Block metadata 222A can identify blocks 220A, 220B, 220C, 220N, and allows storage index 210 to track blocks 220A, 220B, 220C, 220N at content storage 142. Block metadata 222A can include an identifier for each block 220A, 220B, 220C, 220N. The identifier for a block can be a name or key, such as a hash of the block, which identifies the block.

Block metadata 222A can also include location information for blocks 220A, 220B, 220C, 220N, which indicates the respective storage location of blocks 220A, 220B, 220C, 220N. The location information of a block can identify the storage device or volume where the block is stored and/or a logical storage container or data cluster where the block is contained. The location information can be used to access or retrieve the associated block.

Content storage interface 206 can store block metadata 222A at storage index 210 before or after storing blocks 220A, 220B, 220C, 220N at content storage 142. For example, content storage interface 206 can store blocks 220A, 220B, 220C, 220N at content storage 142 and subsequently store block metadata 222A at storage index 210 to indicate that blocks 220A, 220B, 220C, 220N have been stored at content storage 142.

In some cases, content storage interface 206 can query storage index 210 prior to storing blocks 220A, 220B, 220C, 220N at content storage 142, to determine if (or where) blocks 220A, 220B, 220C, 220N are stored at content storage 142. For example, content storage interface 206 can query storage index 210 based on block metadata 222A to check if blocks 220A, 220B, 220C, 220N are stored at content storage 142. Storage index 210 can compare block identifiers in block metadata 222A with block identifiers at storage index 210 to check for any matches. A match between block identifiers indicates that an associated block is stored at content storage 142.

As previously mentioned, server file journal 148 tracks content item revisions, including content item adds, edits, moves or renames, deletes, etc. Accordingly, file journal interface 202 can store revision 222C at server file journal 148 to indicate that content item 220 and/or blocks 220A, 220B, 220C, 220N were added to content storage 142. Revision 222C can represent a revision of content item 220 within a journal of content item revisions at server file journal 148.

Revision 222C can identify content item 220 and an operation associated with content item 220, such as an add operation (e.g., upload), edit operation, move or rename operation, delete operation, etc. Revision 222C can also identify a namespace in content management system 110 where content item 220 is stored, and a row in a journal of content item revisions at server file journal 148 for storing revision 222C. The row within the journal of content item revisions can represent a revision number associated with revision 222C for content item 220.

FIG. 3A illustrates a diagram of communications processed by file journal interface 202 between client device 150 and server file journal 148. Server file journal 148 tracks content item state and changes (e.g., revisions) as values in rows and fields in server file journal 148. For example, server file journal 148 can maintain one or more journals of revisions to content items in content storage 142. The one or more journals can track revisions of each content item on each namespace. A row of values in a journal on server file journal 148 can identify a content item in a namespace and reflects a state of the content item in the namespace. A subsequent row in the journal corresponding to the same content item in the namespace can reflect a subsequent revision to the content item in the namespace. Thus, rows in server file journal 148 associated with a content item can identify the current state of the content item and any revisions to the content item from creation to the current state.

To synchronize content item information (e.g., state, changes or revisions, etc.) with client device 150, server file journal 148 can send or receive revisions data 304 to or from file journal interface 202, which represent revisions tracked or stored in server file journal 148 for one or more content items. Revisions data 304 can include, for example, a log of content item revisions corresponding to rows in server file journal 148. Server file journal 148 can send revisions data 304 to file journal interface 204, which can translate revisions data 304 into operations data 302 for client device 150, as further described below.

Client device 150 can perform content operations to update or modify content items at client device 150. To synchronize content item information with server file journal 148, client device 150 can send or receive operations data 302 to or from file journal interface 202. Client device 150 can send operations data 302 to file journal interface 202 to report changes at client device 150 to content items, and receive operations data 302 from file journal interface 202 to obtain the latest state of content items from server file journal 148 (e.g., revisions data 304).

For example, client device 150 can edit content item A at client device 150 and report to file journal interface 202 an edit operation indicating the edit to content item A. The edit operation can be included in operations data 302 communicated with file journal interface 202 to indicate the revision to content item A. File journal interface 202 can receive operations data 302 including the edit operation and generate a revision for storage at server file journal 148, tracking the edit to content item A. File journal interface 202 can include the revision associated with the edit operation in revisions data 304 to server file journal 148, in order to update server file journal 148 to store the revision representing the edited state of content item A.

As further described below, operations data 302 can include a cursor which identifies the latest state or revision obtained by client device 150 for each namespace associated with client device 150. For example, the cursor can identify the latest revision in server file journal 148 obtained by client device 150 for each namespace associated with client device 150. The information in the cursor allows file journal interface 202 to determine whether an operation in operations data 302 from client device 150 reflects the latest state or revisions in server file journal 148 for the namespace(s) associated with the operation. This can help file journal interface 202 ensure that operations in operations data 302 from client device 150 that correspond to older revisions in server file journal 148 are not written to server file journal 148, which can create a conflict between existing revisions in server file journal 148 and revisions translated from operations data 302.

To enable synchronization of content item information between client device 150 and server file journal 148, file journal interface 202 can translate (e.g., via translation service 204) operations data 302 to revisions data 304, and vice versa. When receiving operations data 302 from client device 150, file journal interface 202 can convert operations data 302 to revisions data 304, which includes content item revisions interpreted from operations in operations data 302. When receiving revisions data 304 from server file journal 148, file journal interface 202 can convert revisions data 304 to operations data 302, which include operations for implementing revisions in revisions data 304 at client device 150. Revisions data 304 includes data in server file journal 148 describing what happened to one or more content items (i.e., revisions to the one or more content items), and operations data 302 includes operations that have been executed or should be executed at client device 150 to modify the one or more content items. Thus, file journal interface 202 can translate data describing revisions to one or more content items from server file journal 148 (e.g., operations data 304) to operations that have or should be executed at client device 150 to modify the one or more content items at client device 150.

As previously noted, in addition to translating operations data 302 from client device 150 to revisions data 304 for server file journal 148, file journal interface 202 can convert revisions data 304 from server file journal 148 to operations data 302 for client device 150. File journal interface 202 can obtain revisions data 304 from server file journal 148 and translate revisions in revisions data 304 to operations for execution at client device 150 to revise one or more content items at client device 150 according to such revisions. The operations generated from the revisions in revisions data 304 are included in operations data 302 provided by file journal interface 202 to client device 150. This translation between operations data 302 and revisions data 304 allows client device 150 and server file journal 148 to synchronize content item information with each other as necessary.

Prior to writing to server file journal 148 any revision data 304 generated from operations data 302 provided by client device 150, file journal interface 202 can check a cursor in operations data 302 and/or query server file journal 148 to ensure any revisions in revisions data 304 do not create a conflict in server file journal 148. For example, file journal interface 202 can query server file journal 148 to check whether the version of a content item associated with a revision in revisions data 304 is the same the version of the content item at server file journal 148, or whether the version of the content item at server file journal 148 is an updated or different version as the content item to which the revision in revisions data 304 pertains. If server file journal 148 shows that the latest version of the content item is a different version than the version to which revision data 304 pertains, the two versions are in conflict.

File journal interface 202 can update server file journal 148 to store new revisions included in revisions data 304 derived from operations data 302. When querying and/or updating revisions in server file journal 148, file journal interface 202 can query namespace membership store 208 to retrieve namespace ownership information associated with any namespaces affected by the revisions in revisions data 304. The namespace ownership information can indicate which user account(s) own or are members of a particular namespace, and thus are able to access the particular namespace. Thus, file journal interface 202 can analyze the namespace ownership information to ensure server file journal 148 is not updated to include a revision to a namespace from a user account that is not a member of the namespace.

Figure 3B:
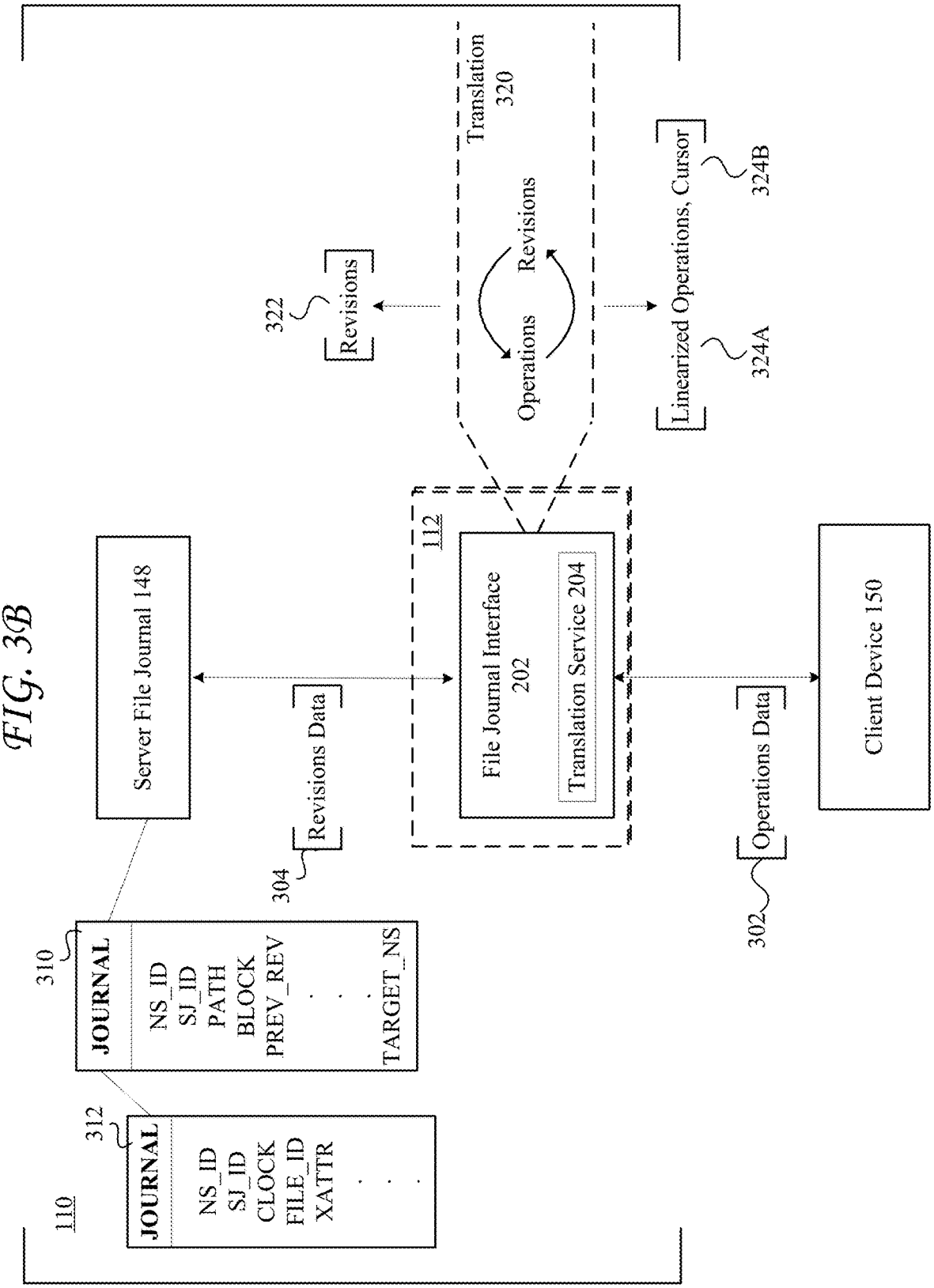
FIG. 3B shows a diagram of an example process for translating communications between a client device and a server file journal on a content management system.

With reference to FIG. 3B, server file journal 148 can store data for records 310 to track and identify content item revisions. In this example, records 310 include a namespace identifier (NS_ID), server journal identifier (SJ_ID), path, block, previous revision (Prev_Rev), and target namespace (Target_NS). NS_ID can include one or more values for uniquely identifying a namespace in server file journal 148. SJ_ID include monotonically increasing values which map to a row in a given namespace and provides an ordering of operations or revisions within that namespace. The path can be a namespace-relative path that identifies an associated content item. Prev_Rev identifies the SJ_ID of the row which corresponds to the previous state of the content item associated with the path. Target_NS identifies the NS_ID of the target namespace for a mount point of a mounted namespace. The Target_NS field is not set for rows (e.g., revisions) which do not correspond to mount points.

In some cases, table 310 can include other fields such as a size field which represents the size of an associated content item, a directory field (e.g., Is_Dir) which can be set to indicate when a content item is a directory, a file identifier that uniquely identifies the associated file, a clock or timestamp field, etc.

File journal interface 202 can perform translation 320 based on operations data 302 and revisions data 304 as previously mentioned. When performing translation 320, translation service 204 can transform operations data 302 into revisions 322, which include linearized revisions for storage at server file journal 148. Translation service 204 can also transform revisions data 304 into linearized operations 324A, included in operations data 302 sent to client device 150, which can be applied by client device 150 to update content item information (e.g., state, changes, etc.) at client device 150. Translation service 204 can also generate or update cursor 324B and provide cursor 324B in operations data 302 to client device 150. Cursor 324B identifies a respective revision or row in server file journal 148 corresponding to each namespace and/or content item associated with linearized operations 324B.

For example, cursor 324B can identify a namespace (e.g., NS_ID) and row in server file journal 148 for that namespace (e.g., SJ_ID), which indicate the latest revision in server file journal 148 for that namespace. The namespace and row in cursor 324B can be associated with an operation in linearized operations 324A. Cursor 324B can identify a specific position on a log of revisions in server file journal 148 for the particular namespace, indicating the revision or state of the namespace in server file journal 148 after and/or before linearized operations 324A are applied at client device 150. Thus, cursor 324B can indicate the state of a namespace and/or content item in server file journal 148 before or after linearized operations 324A, which can help avoid revision conflicts and track the order of revisions before and after linearized operations 324A are applied.

Figure 4A:
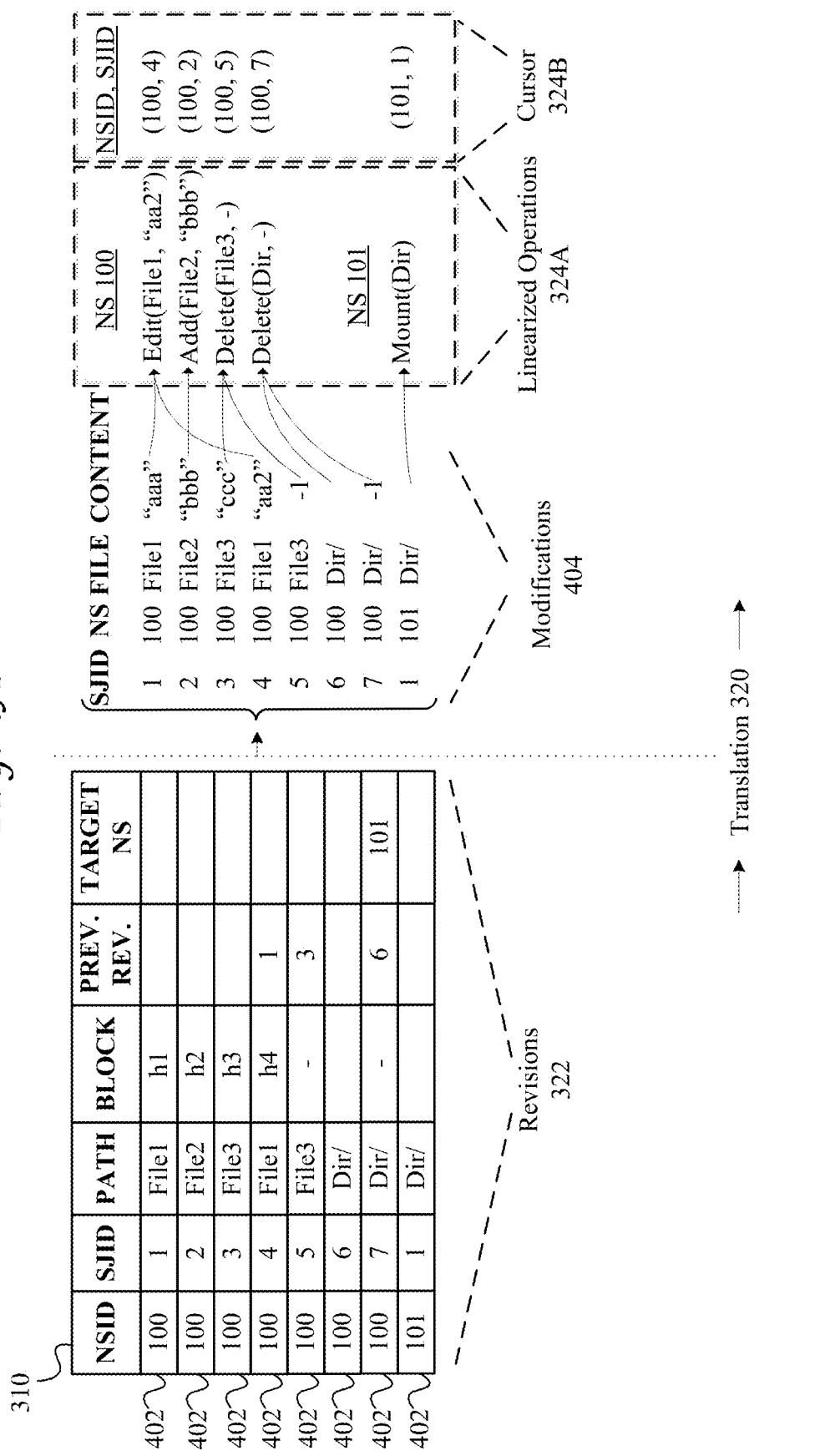
FIG. 4A shows a diagram of an example translation and linearization process for translating server file journal data to linearized operations.

FIG. 4A illustrates a diagram of an example translation and linearization process for translating server file journal data to linearized operations. Server file journal 148 stores journal 400 including rows 402 which include revisions 322. In this example, journal 400 tracks revisions (322) for multiple namespaces, namely namespaces 100 and 101 (i.e., NS_IDs 100 and 101). However, in some cases, server file journal 148 can store namespace-specific journals that track revisions specific to respective namespaces. The rows (e.g., rows 402) in a namespace-specific journal include data specific to that namespace, and each row reflects a revision specific to that namespace.

Each row (402) in journal 400 includes a namespace identifier field (NS_ID) for uniquely identifying a namespace associated with that row, a server journal identifier field (SJ_ID) that includes monotonically increasing values which map to a row in a given namespace and provides an ordering of operations or revisions within that namespace. Journal 400 also includes a path field (Path) for identifying a namespace-relative path of a content item, a block field (Block) for identifying a block or blocklist associated with the content item, a previous revision field (Prev_Rev) for identifying the row (i.e., SJ_ID) in journal 400 that represents the previous state or revision of the content item, and a target namespace field (Target_NS) for identifying a target namespace for a mount point of a mounted namespace (if the row corresponds to a mount). There is no data for the Target_NS field for rows (e.g., revisions) which do not correspond to mount points.

The first of rows 402 in journal 400 identifies the first revision (SJ_ID 1) for "File1" (Path field value File1) in namespace "100" (NS_ID 100), which corresponds to block "h1" and has no previous revisions (Prev_Rev) or target namespaces (Target_NS). Since the row does not include a previous revision or a target namespace, the revision represented by the row corresponds to an addition at namespace "100" of "File1" associated with block "h1". The row in journal 400 containing SJ_ID "4" represents the last revision in journal 400 for "File1" on namespace "100", since this row is the last row or SJ_ID in journal 400 corresponding to "File1" on namespace "100". This row containing SJ_ID "4" indicates that "File1" on namespace "100" was edited after being added in SJ_ID "1", and the edit corresponds to block "h4".

Modifications 404 depict an example of modifications representing revisions 322. In this example, each of modifications 404 illustrates a content revision from a corresponding row (402) in journal 400. Each modification corresponds to an SJID and NSID in journal 400, and a file associated with the corresponding SJID and NSID in journal 400. In this example, the content associated with modifications 404 represents example content values of the blocks (e.g., "h1", "h2", "h3", "h4") in journal 400. The content values in modifications 404 are provided for illustration purposes to depict example modifications to content associated with each revision.

For example, the first modification in modifications 404 represents SJID "1" and NSID "100" in journal 400, and depicts "File1" in namespace "100" being added. Content "aaa" represents a value of "h1" for "File1" at SJID "1" of NSID "100". Modifications 404 also depict an edit of "File1" in namespace "100" representing SJID "4" and NSID "100" in journal 400, which illustrates the content "aaa" (e.g., "h1") associated with "File1" in namespace "100" being modified to "aa2" (e.g., "h4").

In translation 320, revisions 322 from rows 402 in journal 400 are converted to linearized operations 324A. Linearized operations 324A are generated from revisions 322 in journal 400 and represent modifications 404 after linearization. As illustrated by linearized operations 324A, an operation in linearized operations 324A can be based on multiple revisions (322) and/or modifications (404), or a single revision (322) and/or modification (404).

For example, modifications 404 depict a revision adding "File1" to namespace "100", which corresponds to SJID "1" and NSID "100" in journal 400, and a revision editing "File1" in namespace "100", which corresponds to SJID "4" and NSID "100" in journal 400. The add revision can be inferred from the content value "aaa" (e.g., "h1") associated with "File1" and NSID "100" and the lack of any previous revisions for "File1" and NSID "100". In other words, the content "aaa" indicates that content (e.g., "h1") was either added or edited, and the lack of a previous revision for "File1" and NSID "100" suggests that the content "aaa" represents content (e.g., "h1") being added as opposed to edited. The edit revision can be inferred from the content value "aa2" (e.g., "h4") associated with "File1" and NSID "100" and the previous revision (SJID "1" and NSID "100") associated with "File1" and NSID "100". In other words, the change from content "aaa" to "aa2" associated with "File1" and NSID "100" suggests that the content "aa2" represents an edit.

In linearized operations 324A, the add and edit modifications (404) corresponding to SJID "1" and SJID "4" for NSID "100" can be converted into a single linearized operation (Edit operation) which edits the content value associated with "File1" from "aaa" (e.g., "h1") to "aa2" (e.g., "h4"). The single linearized operation editing content (e.g., "h1") of "File1" to "aa2" (e.g., "h4") reflects the modification adding "File1" associated with content "aaa" (e.g., "h1") to namespace "100", as well as the modification editing content "aaa" (e.g., "h1") associated with "File1" in namespace "100" to "aa2" (e.g., "h4"). Accordingly, this linearized operation is based on two modifications 404 and two corresponding revisions in revisions 322.

The modification in modifications 404 corresponding to SJID "2" and NSID "100" in journal 400 represents a revision adding "File2" associated with content "bbb" (e.g., "h2") to namespace "100". This modification represents the only revision 322 from journal 400 corresponding to "File2" on namespace "100". Accordingly, linearized operations 324A include a single operation for "File2" on namespace "100", which adds "File2" associated with content "bbb" (e.g., "h2") to namespace "100" and is based on a single modification 404 (add of "File2" on namespace "100") and revision 322.

Modifications 404 in this example also include for a modification adding "File3" associated with content "ccc" (e.g., "h3") to namespace "100", which corresponds to SJID "3" and NSID "100" in journal 400, and a delete (represented as "−1") of "File3" from namespace "100", which corresponds to SJID "5" and NSID "100" in journal 400. Thus, revisions 322 include two modifications 404 associated with "File3" on namespace "100". Since the last revision in journal 400 associated with "File3" and namespace "100" corresponds to the delete modification representing SJID "5" and NSID "100" in journal 400, the add and delete modifications 404 associated with "File3" and namespace "100" from revisions 322 can be linearized to a single operation deleting "File3" from namespace "100". Accordingly, linearized operations 324A include a single operation for "File3" and namespace "100", which is the single operation deleting "File3" from namespace "100".

SJIDs "6" and "7" for NSID "100" and SJID "1" for NSID "101" in journal 400 represent "Dir" being added to namespace "100" and later moved from namespace "100" to namespace "101". For example, SJID "6" and NSID "100" identifies "Dir" and namespace "100" and does not include a previous revision, which indicates "Dir" was added to namespace "100" at SJID "6". SJID "7" identifies "Dir" being moved from namespace "100" to namespace "101", as reflected by the block field ("-"), the previous revision field (SJID "6"), and the target namespace field ("101"). SJID "1" for NSID "101" then identifies "Dir" being added to namespace "101", as indicated by the lack of prior rows or revisions for "Dir" and namespace "101". The add and move revisions in SJIDs "6" and "7" in NSID "100" and SJID "1" in NSID "8" are depicted by three modifications 404: an add of "Dir" to namespace "100" which corresponds to SJID "6" and NSID "100", a delete of "Dir" from namespace "100" which corresponds to SJID "7" and NSID "100", and an add of "Dir" to namespace "101" which corresponds to SJID "1" and NSID "101".

The add and delete modifications 404 of "Dir" and namespace "100", which respectively correspond to SJIDs "6" and "7" of NSID "100" in journal 400, are linearized to a single operation deleting "Dir" from namespace "100", since the last revision in journal 400 corresponding to "Dir" and namespace "100" is a delete of "Dir" from namespace "100" at SJID "7" and NSID "100". The add of "Dir" to namespace "101", which corresponds to SJID "1" and NSID "101" in journal 400, is the only modification 404 and revision 322 corresponding to "Dir" and namespace "101". Accordingly, the add is provided in linearized operations 324A as a single mount operation for "Dir" and namespace "101". Therefore, the three modifications 404 from revisions 322 corresponding to SJIDs "6" and "7" in NSID "100" and SJID "1" in NSID "101" (i.e., the add and delete of "Dir" on namespace "100", and the add of "Dir" on namespace "101"), are linearized to two operations in linearized operations 324A: a delete operation for "Dir" in namespace "100" and a mount operation for "Dir" in namespace "101".

As illustrated above, linearized operations 324A include an edit operation for "File1" and namespace "100", an add operation for "File2" and namespace "100", a delete operation of "File3" in namespace "100", a delete operation for "Dir" in namespace "100", and a mount operation for adding "Dir" to namespace "101". These operations in linearized operations 324A are generated from revisions 322 and reflect the latest state of each content item in journal 400. File journal interface 202 can generate linearized operations 324A and send linearized operations 324A to client device 150 to ensure client device 150 contains the latest state from revisions 322 in journal 400.

When providing linearized operations 324A to client device 150, file journal interface 202 can include cursor 324B along with linearized operations 324A to client device 150. Cursor 324B can identify the last revision (SJID) for each namespace (NSID) in journal 400. In some embodiments, cursor 324B can also include an FSAuth token including the user ID, and the last observed access permissions to the NS_ID provided in the cursor. The last revision for each namespace can indicate a position in journal 400 corresponding to the latest revisions sent to client device 150 for each namespace.

In some cases, cursor 324B can also map each operation in linearized operations 324A to a namespace (NSID) and row (SJID) in journal 400. The namespace and row associated with an operation can indicate the position in journal 400 corresponding to the operation. In other words, the namespace and row associated with an operation can indicate the revision number in journal 400 represented by that operation. The namespaces and rows in cursor 324B correspond to the latest state in journal 400 for each namespace and content item associated with linearized operations 324A. Cursor 324B can provided to client device 150 as a tool for client device 150 to identify to file journal interface 202 the latest state or revisions obtained by client device 150 for one or more namespaces and/or content items when attempting to apply changes (e.g., via operations data 302) from client device 150 to the one or more namespaces and/or content items. When file journal interface 202 receives cursor 324B from client device 150, it can use cursor 324B to identify the position of client device 150 at journal 400 (e.g., the latest revisions from journal 400 obtained by client device 150) and detect or avoid conflicts caused by operations from client device 150.

For example, if file journal interface 202 receives an operation from client device 150 modifying "File1" in namespace "100", file journal interface 202 can use cursor 324B, which it receives from client device 150 along with the operation, to check whether journal 400 has any newer revisions for "File1" in namespace "100" than the revision identified in cursor 324B from client device 150. If the revision in cursor 324B is the most current revision in journal 400, file journal interface 202 can commit the edit operation as a new revision in journal 400 (e.g., SJID "8" in NSID "100") for "File1" in namespace "100".

Alternatively, if the revision in cursor 324B is not the most current revision in journal 400 for "File1" in namespace "100", file journal interface 202 can determine that the edit operation from client device 150 is not based on the most current version in journal 400 for "File1" in namespace "100". For example, if cursor 324B identifies SJID "4" and NSID "100" in journal 400 and file journal interface 202 determines that journal 400 includes a revision at SJID "12" and NSID "100" for "File1" in namespace "100", file journal interface 202 can determine that the edit operation from client device 150 pertains to an older version of "File1" on namespace "100" (e.g., SJID "4" and NSID "100"), and the edit operation can create a conflict as it edits a file that has since been modified. File journal interface 202 can detect this conflict created by the edit operation and reject the edit operation, attempt to reconcile the conflict, or provide the latest revisions to client device 150 and allow client device 150 to reconcile the conflict.

Each time file journal interface 202 sends linearized operations to client device 150, it can include a cursor as described here which identifies a respective position in journal 400 for each namespace and/or content item. Similarly, any time client device 150 sends an operation to file journal interface 202, it can include its latest cursor which file journal interface 202 can use to map the state at client device 150 with the state at journal 400.

Journal 400 in this example depicts a journal with multiple namespaces. As previously noted, in some examples, server file journal 148 can maintain namespace-specific journals. Cursor 324B may include an SJID and NSID for each namespace, to indicate the latest revision for each namespace. Based on cursor 324B, file journal interface 200 can query multiple journals, in embodiments where multiple journals are maintained, and/or retrieve revisions from multiple journals, as further explained herein.

Figure 4B:
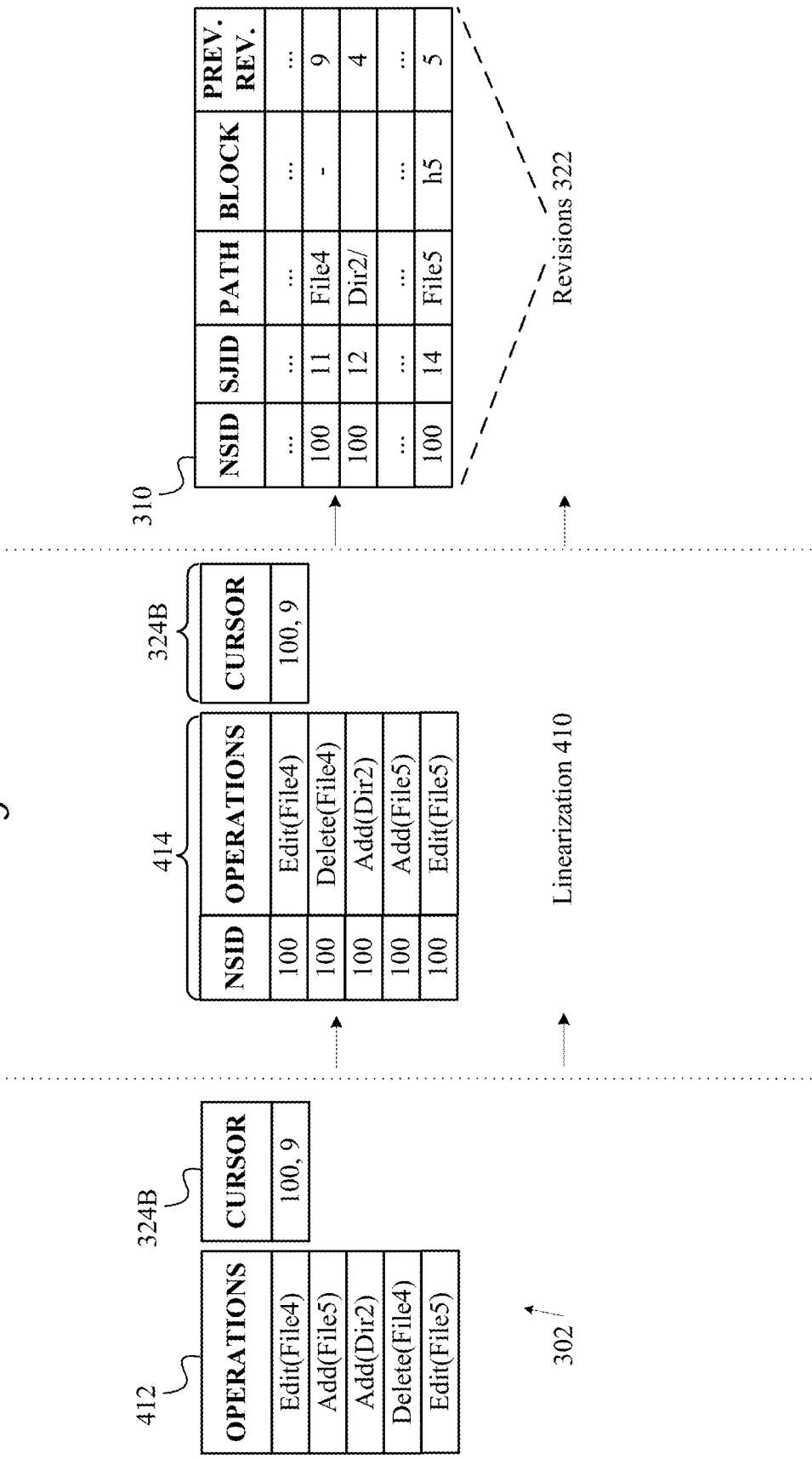
FIG. 4B shows a diagram of an example translation and linearization process for translating operations from a client device to revisions for a server file journal.

FIG. 4B illustrates a diagram of an example process for linearization 410 to convert operations data 302 from client device 150 to revisions 322 for journal 400 at server file journal 148. Client device 150 can provide operations data 302 to file journal interface 202. Operations data 302 in this example includes operations 412 at client device 150, such as content item edit, add, rename, move, mount, or delete operations. In some cases, operations 412 can include multiple operations to a same content item. For example, operations 412 can include an operation editing "File4" on namespace "100" and an operation deleting "File4" from namespace "100".

Operations data 302 also includes cursor 324B previously received by client device 150 from file journal interface 202. Cursor 324B can identify the state (e.g., NSID and SJID) or latest revisions in journal 400 for one or more namespaces and/or content items. Client device 150 can provide cursor 324B to file journal interface 202 as a reference point for operations 412. In this example, cursor 324B provides the latest state for namespace "100", which is represented by SJID "9".

In some cases, the cursor is cryptographically signed by content management system 110, which allows file journal interface 202 to determine that the cursor has not been tampered with. Further, since client device 150 commit revisions to server file journal 148 when it has received the most recent revisions from server file journal 148 for the namespace, file journal interface 202 can accept that the last observed access permissions to the NS_ID are still valid, and therefore client device 150 has access to the namespace.

File journal interface 202 can receive operations 412 and cursor 324B and perform linearization 410, to linearize and transform operations 412 from client device 150 to revisions 322 for journal 400. Based on operations 412, file journal interface 202 can generate log 414 of operations. Log 414 can include a list of operations from operations 412 mapped to respective namespace(s) in journal 400. In some cases, log 414 can include linearized operations (324A) generated from operations 412 as previously explained.

File journal interface 202 can use cursor 324B to verify that operations 412 reflect the latest state or revisions in journal 400 before updating journal 400 to reflect the operations in log 414. If file journal interface 202 confirms that cursor 324B reflects the latest state or revisions in journal 400 for the namespaces and/or content items associated with log 414, file journal interface 202 can add revisions 322 to journal 400 based on log 414. Revisions 322 can include the latest state or revision of each content item and/or namespace associated with the operations in log 414.

The operations in log 414 include an add and edit operation for "File5". Accordingly, revisions 322 include the edit of "File5", which file journal interface 202 can write to journal 400 as the latest state of "File5" (i.e., the state after the add and edit operations are applied to "File5" in a linearized fashion). The operations in log 414 also include an add operation for "Dir2" as well as edit and delete operations for "File4" on namespace "100". Revisions 322 can thus include an operation adding "Dir2" to namespace "100" and an operation deleting "File4" from namespace "100" as the latest state of "Dir2" and "File4" respectively.

In FIG. 4B, the revisions (322) depicted in journal 400 reflect the latest state of each content item ("File4", "File5", "Dir2") associated with operations 412. However, it should be noted that, in some cases, file journal interface 202 can write every revision represented by log 414 to journal 400 in order to reflect not only the latest state revision of each namespace and/or content item resulting from log 414, but also any previous states or revisions leading up to the latest state or revision. For example, file journal interface 202 can write a revision in journal 400 for the edit of "File4" and a subsequent revision for the delete of "File4", as opposed to only writing the edit of "File4" reflecting the latest state from operations 412, to indicate in journal 400 the full sequence of revisions of "File4" from operations 412.

File journal interface 202 can transform operations in log 414 to revisions 322 and update journal 400 to include revisions 322. File journal interface 202 can write revisions 322 to journal 400 at respective rows in journal 400. File journal interface 202 can add revisions 322 to the next available rows (e.g., SJIDs) in journal 400. In some cases, file journal interface 202 can add revisions 322 based on a relative order which can be determined based on linearization 410 and/or respective timestamps or clocks.

As shown in FIG. 4B, the delete operation of "File4" in namespace "100" is included in row "11" or SJID "11" for namespace "100". The revision in SJID "11" of journal 400 indicates that "File4" in namespace "100" has been deleted, as reflected by the minus symbol in the block field, and identifies SJID "9" as the previous revision in journal 400 for "File4" in namespace "100". The addition of "Dir2" and edit of "File5" are included respectively in rows or SJIDs 12 and 14.

Journal 400 in FIG. 4B has been updated to include revisions 322 based on log 414 and cursor 324B, to reflect the state of each content item modified in log 414. The path field at each row in journal 400 identifies a content item within the associated namespace (e.g., namespace "100"). The path field of a row is based on the file and namespace from a corresponding operation in log 414. The block field in journal 400 represents the content item. In some cases, the block field can include a hash of a respective content item or data block. The block field can be empty if the content item has been deleted and/or is a directory, folder, mount, etc.

When updating journal 400 to include revisions 322 based on log 414 and cursor 324B, translation service 204 can identify the path of each content item to include in the path field of journal 400. In some cases, translation service 204 can translate an identifier of a content item (e.g., File ID) to a path of the content item (e.g., /directory/filename). For example, client device 150 can use identifiers to identify content items (e.g., content items in operations data 302) without having to track or calculate respective paths for the content items. Journal 400 may instead use a content item's path to identify the content item. Translation service 204 can use the identifiers of content items from client device 150 to calculate the paths of the content items for journal 400, and update journal 400 using the paths calculated for the content items. Translation service 204 can also perform a reverse translation to obtain a content item's identifier based on the content item's path, and use the content item's identifier when referencing the content item in communications with client device 150.

For example, translation service 204 can use the path in journal 400, NSID in journal 400, and/or a directory field in journal 400 (or elsewhere in server file journal 148) to identify a content item and obtain an identifier (e.g., File ID) of that content item. If file journal interface 202 sends an update or information to client device 150 pertaining to that content item, file journal interface 202 can provide the identifier of the content item to client device 150, which client device 150 can use to identify the content item with or without the path of the content item.

As previously mentioned, before writing revisions 322 to journal 400 from operations 412, file journal interface 202 can check if cursor 324B reflects the latest state or revision in journal 400 for each namespace and/or content item associated with operations 412. In some cases, after confirming that cursor 324B reflects the latest state or revisions in journal 400, file journal interface 202 can also perform a second check to ensure that a revision generated from operations 412 will not conflict with an existing revision in journal 400. For example, if SJID "5" in namespace "100" at journal 400 represents a delete operation of "File5", the edit revision 322 of "File5" depicted in SJID "14" emitted from operations 412 received by file journal interface 202 from client device 150 would create a conflict by attempting to edit "File5" even though "File5" was deleted at SJID "5". Thus, file journal interface 202 can reject the edit operation and revision in this example, and communicate to client device 150 that the edit operation is invalid. File journal interface 202 can update cursor 324B and provide the updated cursor to client device 150 to inform client device 150 of the latest state or revision in journal 400 for "File5" (and any other content item) as necessary.

Figure 5A:
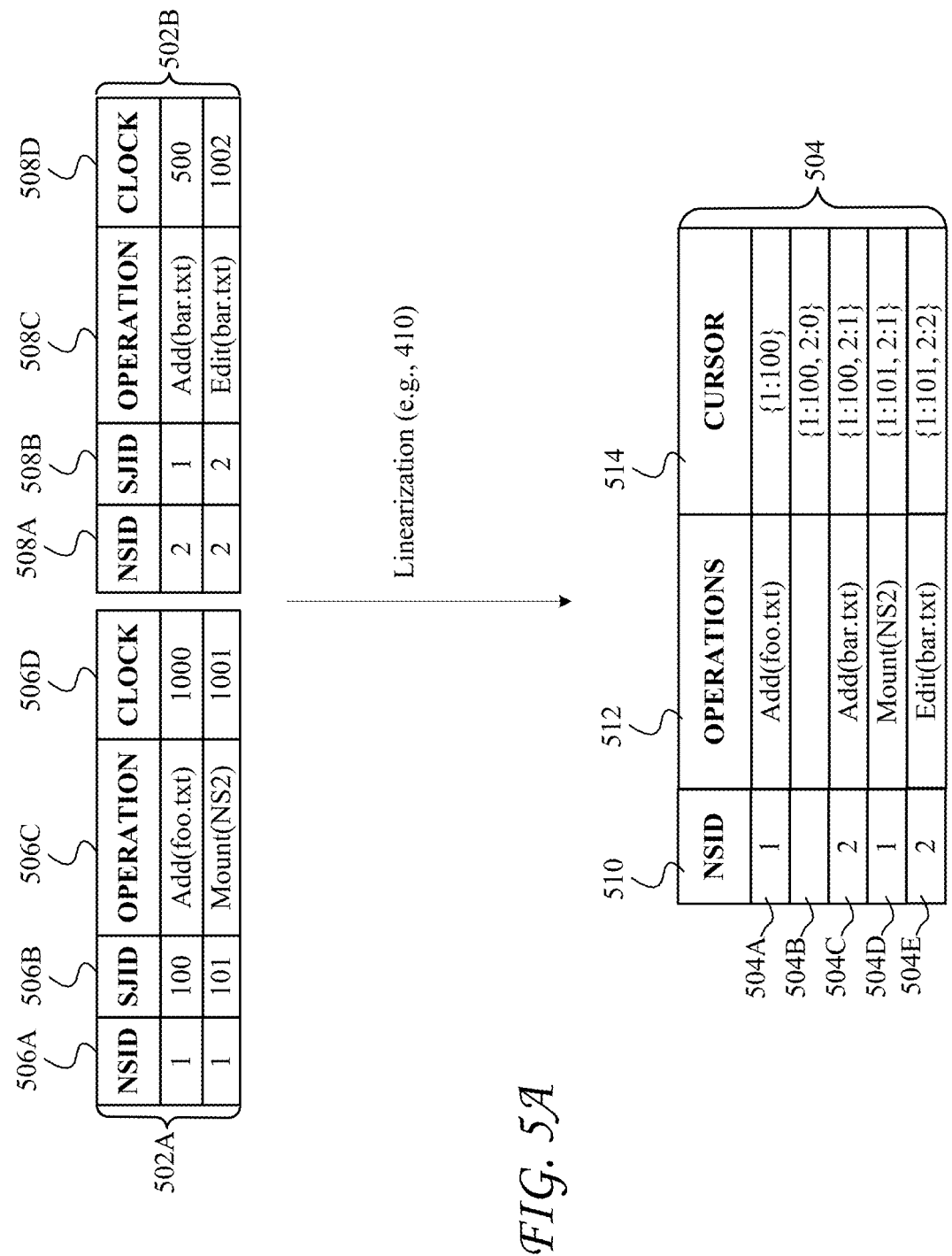
FIG. 5A shows an example linearization of cross-namespace operations.

FIG. 5A illustrates a diagram of an example linearization of cross-namespace operations. Cross-namespace linearization and cross-shard or cross-namespace listing can be performed via clock ordering. Tables 502A, 502B (collectively "502") illustrate a batch of cross-namespace operations for linearization. Tables 502A, 502B respectively include columns 506A, 508A, which are namespace (NSID) fields for identifying a namespace for the records in tables 502A, 502B, columns 506B, 508B are SJID fields for identifying rows or SJIDs in tables 502A, 502B for respective namespaces in columns 506A, 508A, columns 506C, 508C are operations fields for identifying operations associated with each SJID, and columns 506D, 508D are clock fields for identifying a timestamp associated with the operations in columns 506C, 508C.

In this example, table 502A depicts SJIDs "100" and "101" for NSID "1". SJID "100" is associated with an operation adding "foo.txt" to namespace "1" at timestamp "1000", and SJID "101" is associated with an operation mounting namespace "2" at timestamp "1001". Table 502B depicts SJIDs "1" and "2" for NSID "2". SJID "1" is associated with an operation adding "bar.txt" to namespace "2" at timestamp "500", and SJID "2" is associated with an operation editing "bar.txt" at timestamp "1002".

A linearizer (e.g., translation service 204) can obtain the batch of operations in tables 502 and emit a single stream of operations (512) with a cursor (514). The linearizer can identify all namespaces having at least one operation in tables 502 and linearize the operations for all namespaces based on the respective timestamps, NSIDs, SJIDs. In this example, the batch of operations in tables 502 linearize to the stream of operations shown in table 504.

Table 504 includes NSID column 510 which includes NSID fields for identifying the namespace of each operation, operations column 512 which includes operation fields for identifying the operations in table 504, and cursor column 514 which includes cursor fields for identifying a cursor state for each operation. Row 504A in table 504 includes the add operation from SJID "100" of namespace "1" in table 502A. The cursor state in cursor column 514 for row 504A is namespace "1" and SJID "100", which indicates the add operation corresponds to SJID "100" in namespace "1" shown in table 502A. Row 504B in table 504 does not include a value in NSID column 510 or operations column 512, but updates the cursor state in cursor column 514 to include a cross-namespace cursor state, which in this example adds SJID "0" for namespace "2".

Row 504C in table 504 includes the add operation from SJID "1" in namespace "2" shown in table 502A. The cursor state in cursor column 514 for row 504C includes the respective SJIDs "100" and "1" for namespaces "1" and "2" associated with the add operation in row 504C. As shown, the cursor state indicates the cursor is at SJID "100" in namespace "1" and SJID "1" in namespace "2". In other words, the row or SJID in namespace "1" has not increased as the add operation does not affect the state of namespace "1", but the row or SJID in namespace "2" has increased by one as the add operation represents a revision in namespace "2" and affects the state of namespace "2". Thus, the cursor state in row 504C tracks the respective SJIDs for namespace "1" and namespace "2" after the add operation at SJID "1" in namespace "2".

Row 504D in table 504 includes the mount operation at SJID "101" and namespace "1" at table 502A. The mount operation mounts namespace "2" at namespace "1". The mount operation increases the SJID in namespace "1" from "100" to "101", but does not increase the SJID in namespace "2". Accordingly, the cursor state in cursor column 514 for row 504D includes SJID "101" for namespace "1" and remains SJID "1" for namespace "2". This cursor state reflects the state and/or order at namespaces "1" and "2".

Row 504E in table 504 includes the edit operation at SJID "2" and namespace "2" in table 502A, which according to the respective timestamps of the mount and edit operations, is after the mount operation at SJID "101" in namespace "1". The cursor state in cursor column 514 of row 504E maintains the cursor state for namespace "1" at SJID "101" but increases the cursor state for namespace "2" to SJID "2".

As illustrated in table 504, operations 512 are listed as a stream of operations linearized based on causality and timestamps across namespaces "1" and "2". Once operations 512 are linearized in table 504 to reflect cross-namespace causality and sequencing, operations 512 can be converted to revisions in server file journal 148 (e.g., revisions 322 in journal 400) and written to server file journal 148.

For example, a journal for namespace "1" in server file journal 148 can be updated to include a revision at SJID "100" representing the add operation adding "foo.txt" to namespace "1", and a revision at SJID "101" representing the mount operation mounting namespace "2" on namespace "1". Moreover, a journal for namespace "2" in server file journal 148 can be updated to include a revision at SJID "1" representing the add operation adding "bar.txt" to namespace "2", and a revision at SJID "2" representing the edit operation editing "bar.txt" on namespace "2".

Figure 5B:
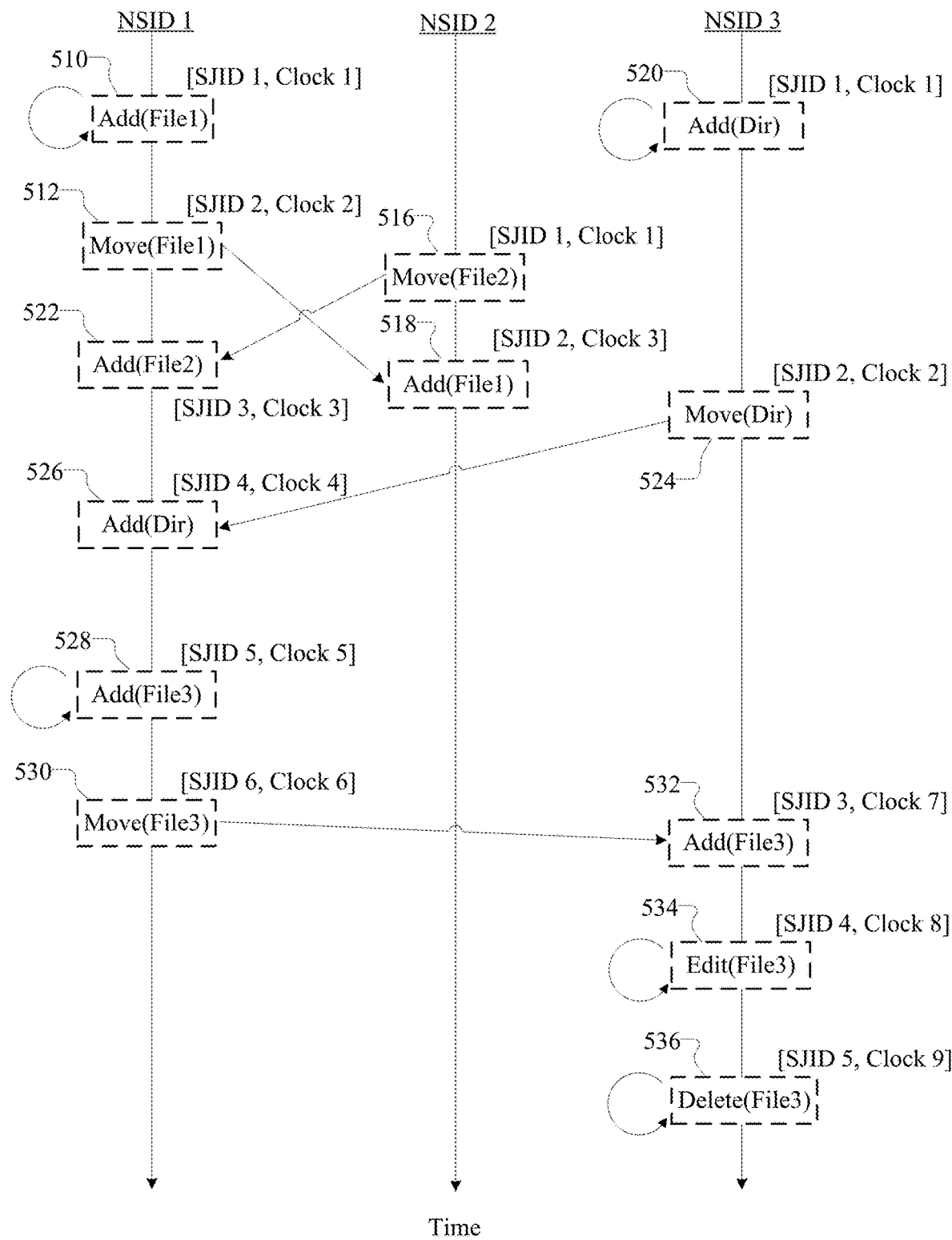
FIG. 5B shows a diagram of events across namespaces ordered according to lamport clocks calculated for the events.

FIG. 5B illustrates a diagram of events across namespaces ordered according to lamport clocks calculated for the events. In this example, various operations have been executed across namespaces NSID 1, NSID 2, and NSID 3. Each namespace maintains an SJID for every operation at that namespace in order to determine the ordering of operations within the namespace. However, the SJID of a namespace does not identify ordering and causality of operations across namespaces. Accordingly, lamport clocks are calculated for the operations in the namespaces NSID 1, 2, 3 to determine causality and obtain a cross-namespace ordering of operations.

At NSID 1, operation 510 has SJID 1 and clock 1. At NSID 2, operation 516 has SJID 1 and clock 1. At NSID, operation 520 has SJID 1 and clock 1. Operations 510, 516, 520 span multiple namespaces and do not have causal relationships. Accordingly, operations 510, 516, 520 do not affect each other's clocks.

Ordering of operations within the namespace can be determined based on the SJID at the namespace. Clocks for operations within the same namespace can simply be incremented by 1. Thus, at SJID 2 in NSID 1, the clock for operation 512 is incremented to 2.

Operation 512 in NSID 1 is a move of File1 to NSID 2. Accordingly, operation 512 triggers operation 518 at NSID 2, which is the add of File1 at NSID 2. Since operation 518 at NSID 2 is causally dependent on another operation from a different namespace, namely operation 512 from NSID 1, the clock for operation 518 is calculated based on the clock at NSID 1 and the clock at NSID 2. The algorithm can be expressed as: TargetNS_clock$_{t1}$=max(Source_NS$_{clock}$, TargetNS_clock$_{t0}$)+1. Thus, in this example, the clock for operation 518 at NSID 2 is 3 (e.g., max(2, 1)+1). Accordingly, operation 518 at NSID 2 has SJID 2 and clock 3.

Similarly, operation 516 at NSID is a move of File2 from NSID 2 to NSID 1. Operation 516 thus triggers operation 522 at NSID 1, for adding File2 at NSID 1. The clock for operation 522 is calculated based on the clock algorithm, which equals 3. Thus, operation 522 has SJID 3 at NSID 1 and clock 3.

Operation 522 at NSID 3 is causally dependent on an operation in the same namespace, namely operation 520 at NSID 3. Thus, the clock for operation 522 can be calculated by incrementing the clock of operation 520 at NSID 3. In this example, the clock for operation 522 is therefore 2. Operation 522 at NSID 3 has SJID 2 and clock 2. Since operation 522 is a move operation for moving Dir to NSID 1, operation 522 triggers operation 524 at NSID 1, adding Dir to NSID 1.

Since operation 524 is triggered by operation 522 in a different namespace (NSID 3), the clock for operation 524 is calculated based on the clock at NSID 1 and the clock for operation 522. Accordingly, the clock for operation 524 is set to 4 (e.g., max(2, 3)+1). Operation 524 thus has SJID 4 at NSID 1 and clock 4.

Operation 526 at NSID 1 adds File3 to NSID 1, and is not a cross-namespace operation. Accordingly, the clock for operation 526 is calculated by incrementing the clock at NSID 1. The clock for operation 526 is thus set to 5.

Operation 528 is causally dependent on operation 526 also within NSID 1. The clock for operation 528 is thus set to 6 by incrementing the clock of operation 526 at NSID 1. Operation 528 has SJID 6 at NSID 1 and clock 6.

Operation 528 is a move operation which moves File3 to NSID 3. Operation 528 thus triggers operation 530 at NSID 3. Since operation 530 is based on an operation from a different namespace, its clock is calculated using the clock algorithm based on the clock at NSID 3 and the clock of operation 528. In this case, the clock for operation 530 is set to 7. Operation 530 thus has SJID 3 at NSID 3 and clock 7.

Operations 532, 534 are not cross-namespace operations and are causally related to operation 530 at NSID 3. Thus, the clock for operations 532, 534 can be calculated by incrementing the clock of operation 530. In this example, the clocks for operations 532, 534 are set to 8 and 9 respectively.

Figure 6A:
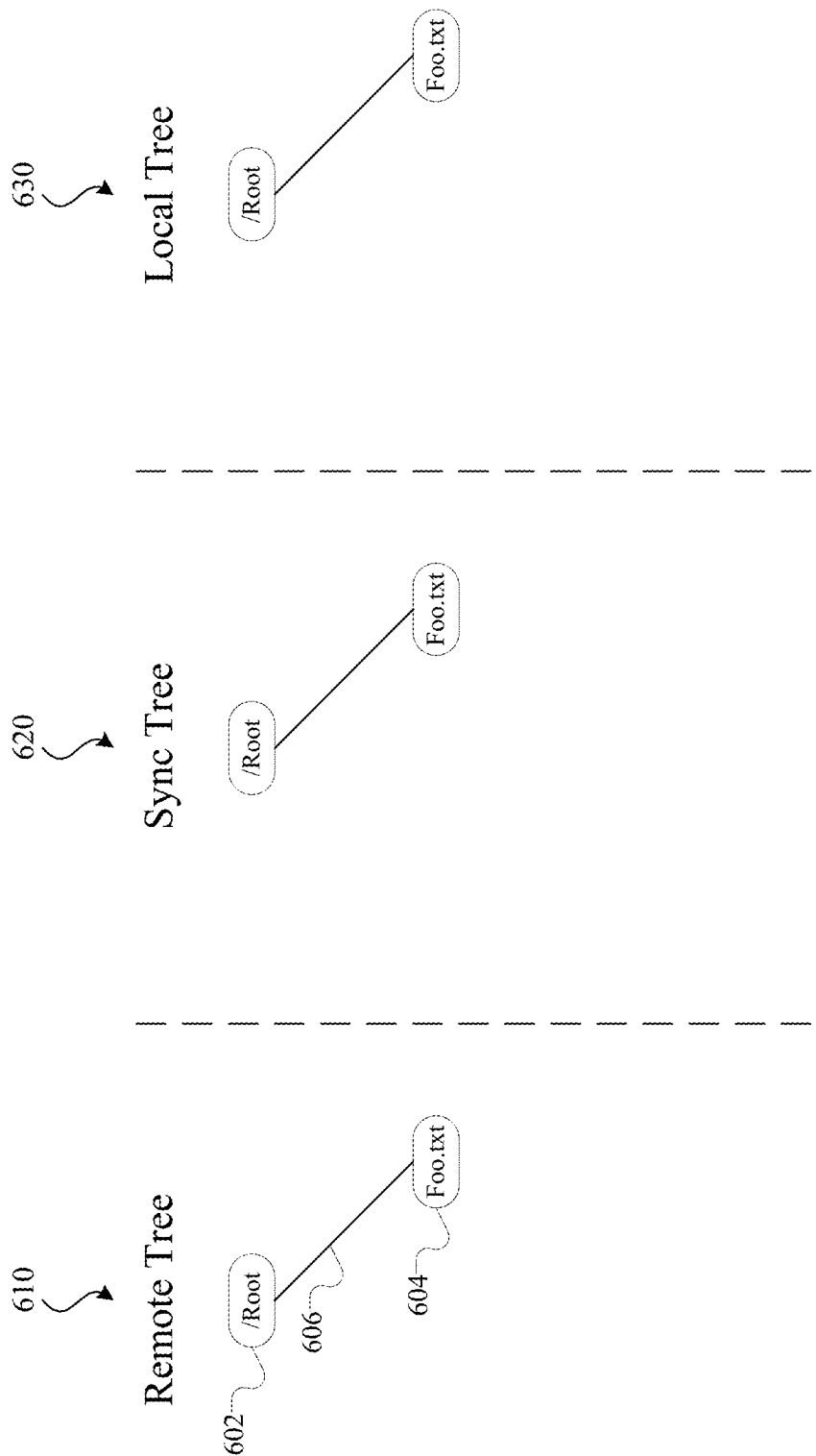
FIG. 6A shows an example of tree data structures in accordance with various aspects.

FIG. 6A shows an example of tree data structures, in accordance with various embodiments. The tree data structures may be stored at the client device and managed by a client synchronization service such as client synchronization service 156. In FIG. 6A, the tree data structures are shown including remote tree 610, sync tree 620, and local tree 630.

Remote tree 610 represents a server state or the state of content items stored remotely from the client device (e.g., on a server of the content management system). Local tree 630 represents a file system state or the state of the corresponding content items stored locally on the client device. Sync tree 620 represents a merge base for the local tree and the remote tree. The merge base may be thought of as a common ancestor of the local tree and the remote tree or a last known synced state between the local tree and the remote tree.

Each tree data structure (e.g., remote tree 610, sync tree 620, or local tree 630) may include one or more nodes. Each node may have one or more child nodes and the parent-child relationship is represented by an edge. For example, remote tree 610 includes nodes 602 and 604. Node 602 is a parent of node 604 and node 604 is a child of node 602. This parent-child relationship is represented by edge 606. A root node, such as root node 602, does not have a parent node. A leaf node, such as node 604, does not have a child node.

Each node in a tree data structure may represent a content item (e.g., a file, document, folder, etc.). For example, root node 602 may represent the root folder associated with the content management system and node 604 may represent a file (e.g., a text file named "Foo.txt") located in that root folder. Each node in a tree data structure may contain data such as, for example, a directory file identifier ("DirFileID") specifying the file identifier of a parent node of the content item, a file name for the content item, a file identifier for the content item, and metadata for the content item.

As described above, a client synchronization service may determine that the server state and the file system state of the client device are synchronized when all 3 trees (e.g., remote tree 610, sync tree 620, and local tree 630) are identical. In other words, the trees are in sync when their tree structures and the relationships that they express are identical and the data contained in their nodes are identical as well. Conversely, the trees are not in sync if the 3 trees are not identical. In the example scenario illustrated in FIG. 3, remote tree 610, sync tree 620, and local tree 630 are shown as being identical and in sync and, as a result, the server state and the file system state are synchronized.

Figure 6B:
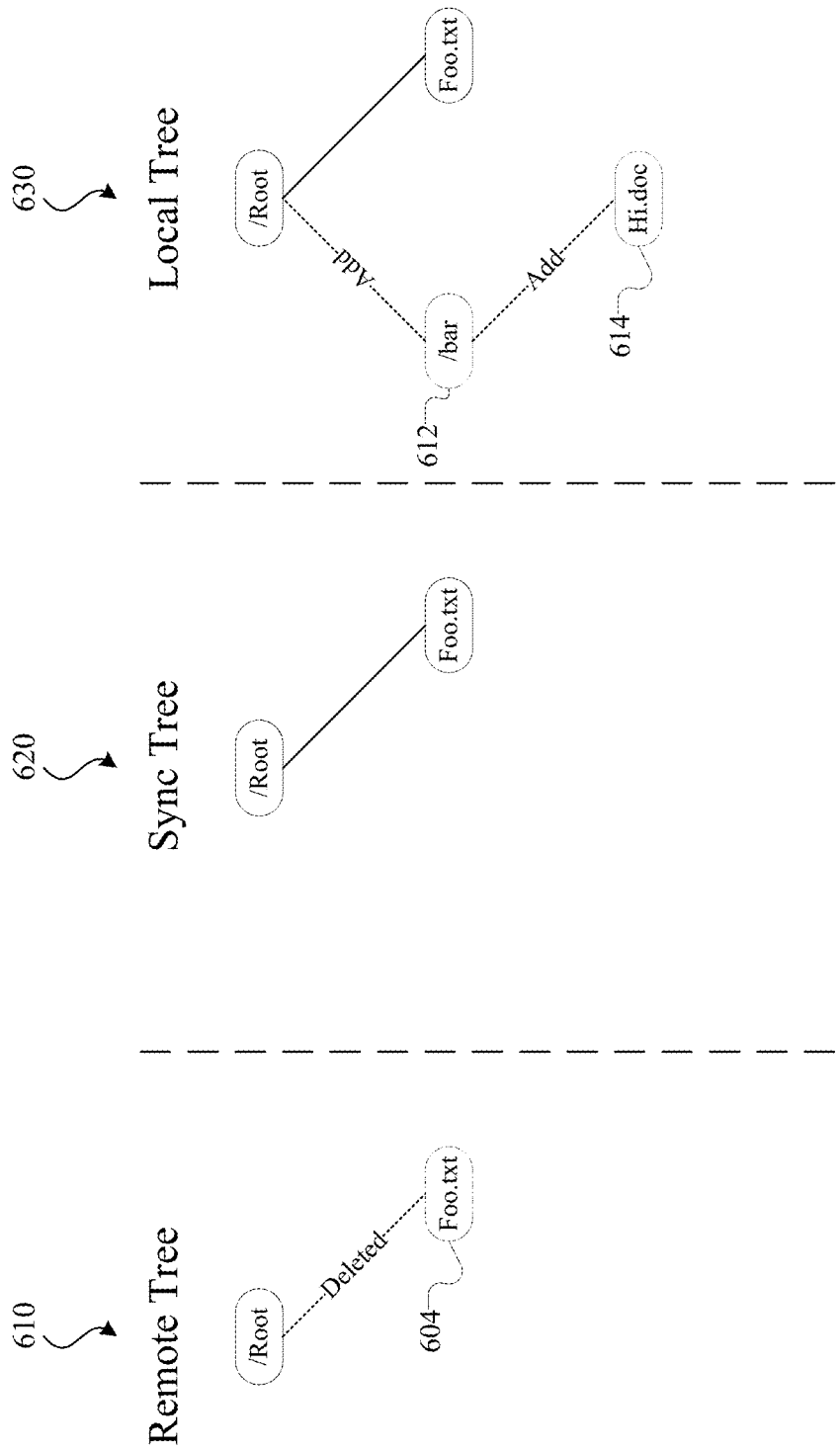
FIG. 6B shows an example of an update to the tree data structures shown in FIG. 6A.

FIG. 6B shows an example of tree data structures, in accordance with various embodiments. This example shows a scenario after a previously synchronized state, such as the scenario illustrated in FIG. 6A, additional actions are performed on the content items represented in the trees to modify the content items such that the trees are no longer in sync. Sync tree 620 maintains a representation of the previously known synchronized state and may be used by the client synchronization service to identify the differences between the server state and the file system state as well as generate operations for the content management system and/or the client device to perform to converge so that the server state and the file system state are synchronized.

For example, a user (the same user as the user associated with the client device or a different user with access to the content item) may make modifications to the "foo.txt" content item stored by the content management system. This content item is represented by node 604 in remote tree 610. The modification shown in the remote tree 610 is a removal (e.g., a removal of the content item from a space managed by the content management system) or delete of the foo.txt content item. These modifications may be performed, for example, on another client device and the modifications were synced to the content item stored by the content management system or content item stored by the content management system via a web browser.

When the change is made on the content management system, the content management system generates modification data specifying the change made and transmits the modification data to the client synchronization service on the client device. The client synchronization service updates the remote tree representing the server state for the content items stored by the content management system based on the modification data. For example, in remote tree 610, node 604 representing the foo.txt content item is shown as deleted.

The client synchronization service may identify a difference between remote tree 610 and sync tree 620 and, as a result, determine that a modification of the content items at the content management system has caused the server state and the file system state to no longer be in sync. The client synchronization service may further generate and execute a sequence of operations for the content items stored on the client device that are configured to converge the server state and the file system state so that they will be in sync.

Additionally or alternatively, a user (the same user as the user associated with modifications at the content management system or a different user with access to the content item) may make modifications to the content items stored locally on the client device that are associated with the content management system. For example, the user may add a folder "/bar" to the "/root" folder and add a "Hi.doc" document to the "/bar" folder.

When the change is made on the client device, the client device (e.g., client synchronization service 156 or client application 152) generates modification data specifying the change made and passes the modification data to the client synchronization service on the client device. The client synchronization service updates the local tree representing the file system state for the content items stored on the client device based on the modification data. For example, in local tree 630, node 612 and node 614 are shown as added. Node 612 and node 614 represent the "/bar" folder and the "Hi.doc" document respectively.

The client synchronization service may identify a difference between local tree 630 and sync tree 620 and, as a result, determine that a modification of the content items at the client device has caused the server state and the file system state to no longer be in sync. The client synchronization service may further generate a sequence of operations for the content items stored by the content management system that are configured to converge the server state and the file system state so that they will be in sync. This sequence of operations may be transmitted to the content management system for execution.

As seen in FIG. 6B, modifications to content items stored on the client device and content items stored by the content management system may occur at substantially the same time or within a particular time period. These modifications can be reflected in the tree data structures and used by the client synchronization service to generate sequences of operations for the client device and for the content management system in parallel. In other scenarios, however, modifications may not necessarily occur within the same time period and sequences of operations may be generated in an as-needed manner. Furthermore, although FIG. 6B illustrates scenarios for adding content items and deleting content items, other types of modifications such as, editing, renaming, copying, or moving content items are also supported.

According to various embodiments, identifying a difference between two tree data structures and generating operations may involve checking each node in both tree data structures and determining whether an action has been performed on the node. The actions may include, for example, the addition of the node, the deletion of the node, the editing of the node, or the moving of the node. These actions may then be used to generate the sequence of operations configured to converge the server state and the file system state.

For example, if the two tree data structures are a sync tree and a remote tree, the client synchronization service may identify each node in the sync tree by, for example, requesting the file identifiers of all nodes in the sync tree. For each node or file identifier for the node in the sync tree, the client synchronization service may determine if the node or file identifier is also in the remote tree. A node or file identifier in the sync tree that is not found in the remote tree may indicate that the node has been deleted from the server state that is represented by the remote tree. Accordingly, the client synchronization service may determine that a delete action has occurred on the remote tree. If the node or file identifier for the node is found in the remote tree, the client synchronization service may check whether the node in the remote tree has been edited or moved.

To determine whether the node in the remote tree has been edited with respect to the node in the sync tree, the client synchronization service may compare the metadata for the node in the sync tree with the metadata for the corresponding node (e.g., the node with the same file identifier) in the remote tree. The metadata may include information that may be used to determine whether the content item represented by the node has been edited. For example, the metadata may include one or more hash values that are generated based on the data in the content item or a portion thereof. The metadata may additionally or alternatively include a size value, a last modified value, or other value for the content item. The metadata for the node in the client synchronization service may be compared with the metadata for the node in the remote tree. If the metadata do not match, an edit of the content item may have been edited in the server state represented by the remote tree. Accordingly, the client synchronization service may determine that an edit action has occurred for the node on the remote tree. If the metadata matches, no edit may have occurred.

To determine whether the node in the remote tree has been moved, the client synchronization service may compare the location for the node in the sync tree with the location for the corresponding node (e.g., the node with the same file identifier) in the remote tree. The location may include, for example, a path where the node is located, a file name, and/or a directory file identifier ("DirFileID") specifying the file identifier of the node's parent. If the locations match, no move may have occurred. On the other hand, if the locations do not match, a move of the content item may have occurred in the server state represented by the remote tree. Accordingly, the client synchronization service may determine that a move action has occurred for the node on the remote tree.

To determine whether a node has been added to the remote tree, the client synchronization service may identify any nodes or file identifiers in the remote tree that are not found in the sync tree. If a node or file identifier is found in the remote tree and not found in the sync tree, the client synchronization service may determine that an add action of this node has occurred on the remote tree representing the server state.

Although the example above is described with respect to the sync tree and the remote tree, in other embodiments, a similar process may occur with the sync tree and a local tree in order to identify a difference between the sync tree and the local tree and determine which actions have occurred on the local tree representing the file system state.

Figure 7A:
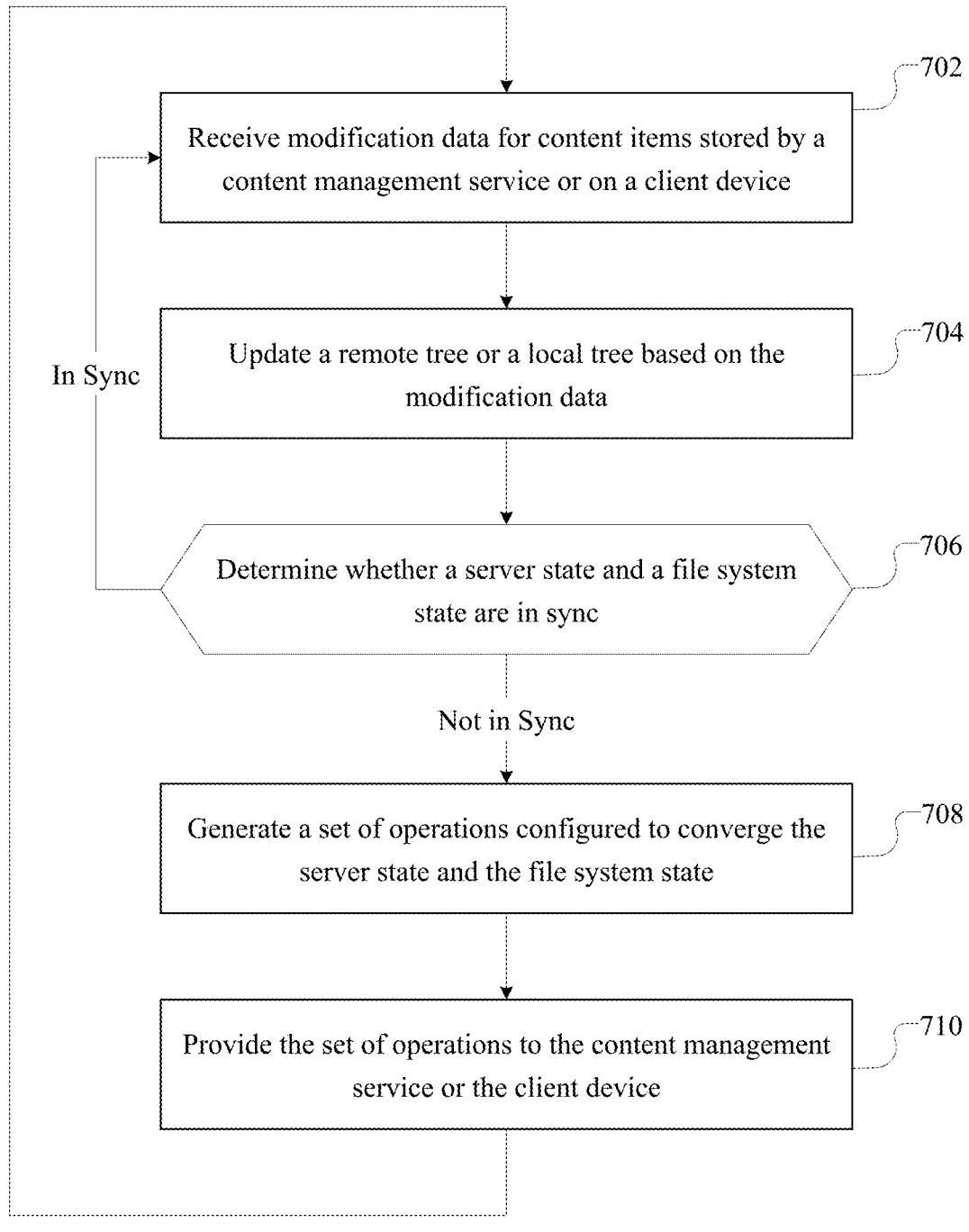
FIG. 7A shows an example method for synchronizing a server state and a file system state using tree data structures.

FIG. 7A shows an example method for synchronizing a server state and a file system state using tree data structures, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method may be implemented by a system such as, for example, client synchronization service 156 on client device 150.

The system is configured to identify a difference between a remote tree representing a server state for content items stored by the content management system, a local tree representing the file system state for the corresponding content items stored on the client device, and a sync tree representing a known synced state between the server state and the file system state. Based on these differences, a sequence of operations may be generated that, if executed, are configured to converge the server state and the file system state towards a synchronized state where the three tree data structures would be identical.

For example, at operation 702, the system may receive modification data for content items stored by a content management system or on a client device. The modification data may be used to update a remote tree or a local tree at operation 704.

The modification data is specifies what changes are done to one or more content items associated with a content management service. Accordingly, the modification data may be received from the content management system or from the client device (e.g., from client application 152). Modification data received from the content management system may be referred to as server modification data. Server modification data specifies what changes are done to one or more content items by the content management system and may be used to update the remote tree at operation 704. Modification data received from the client device may be referred to as client modification data. Client modification data specifies what changes are done to one or more content items on the client device and may be used to update the local tree at operation 704.

At operation 706, the system may determine whether a server state for content items stored by the content management system and a file system state for the content items stored on the client device are in sync. Because the local tree and the remote tree are representative of the file system state and the server state and are continually being updated to track changes that occur at the content management system and the client device, determining whether the server state and the file system state are in sync may be done by comparing the local tree and/or the remote tree to the sync tree to find differences between the trees. This process of finding differences between the trees is sometimes referred to as "diffing" the trees.

According to some embodiments and scenarios, determining whether the server state and the file system state are in sync may include one or more of identifying differences between the remote tree and the sync tree and/or identifying differences between the local tree and the sync tree. Differences between the remote tree and sync tree may indicate the occurrence of changes to content items stored by the content management system that may not be reflected at the client device. Similarly, differences between the local tree and sync tree may indicate the occurrence of changes to content items stored at the client device that may not be reflected at the content management system.

If there are no differences between the trees, the server state and the file system state are in sync and no synchronization actions are needed. Accordingly, the method may return to operation 702 and await new modification data. On the other hand, if differences are detected, the system may generate a sequence of operations configured to converge the server state and the file system state at operation 708.

The sequence of operations generated depends on the one or more differences that are detected. For example, if the difference between two trees is an added content item, the generated sequence of operations may include retrieving the added content item and adding it. If the difference between two trees is a deletion of a content item, the generated sequence of operations may include deleting the content item. The sequence of operations may also include a number of checks to ensure tree constraints are maintained. As will be described further below, the sequence of operations may conflict with the current state of the server state, the file system state, or other operations that are pending execution. Accordingly, the system may also resolve these conflicts before proceeding.

As noted above, if there are differences between the remote tree and sync tree, changes to content items stored by the content management system may have occurred that may not be reflected at the client device. Accordingly, in this scenario, the system may generate a client sequence of operations configured to operate on the content items stored on the client device to converge the server state and the file system state and this client sequence of operations may be provided to the client device for execution at operation 710.

On the other hand, if there are differences between the local tree and sync tree, changes to content items stored at the client device may have occurred that may not be reflected at the content management system. Accordingly, in this scenario, the system may generate a server sequence of operations configured to operate on the content items stored by the content management system to converge the server state and the file system state and this server sequence of operations may be provided to the content management system for execution at operation 710. In some cases, both cases may be true and a client sequence of operations and a server sequence of operations may be generated and provided to their intended recipients at operation 710.

Once the sequence(s) of operations are provided to the intended recipient(s), the method may return to operation 702 and await new modification data. The sequence(s) of operations may provide one or more steps towards the convergence of the server state and the file system state or provide all steps needed to sync the server state and the file system state. For example, the content management system may receive the server sequence of operations and execute the server sequence of operations on content items stored by the content management system. This execution of the server sequence of operations causes changes to the content items stored by the content management system, which are detected and specified in server modification data, which is transmitted back to the system. The system may then update the remote tree and determine whether the server state and the file system state are in sync.

The client device may receive the client sequence of operations and execute the client sequence of operations on content items stored on the client device. This execution of the client sequence of operations causes changes to the content items stored on the client device, which are detected and specified in client modification data, which is passed to the system. The system may then update the local tree and determine whether the server state and the file system state are in sync. These operations of method 700 may continue until the server state and the file system state are in sync.

The operations of method 700 are described with respect to a client side and a server side (e.g., a local tree and a remote tree, a file system state and a server state, a client sequence of operations and a server sequence of operations, client modification data and server modification data). In various embodiments the operations associated with the two sides may occur in parallel, in sequence, in isolation of the other side, or a combination.

As described above with respect to FIG. 7A, differences between a sync tree and a remote tree are identified and used to generate a client sequence of operations configured to converge the server state and the file system state. However, in some cases, the client sequence of operations may conflict with the current state of a local tree. Similarly, differences between the sync tree and the local tree are identified and used to generate a server sequence of operations configured to converge the server state and the file system state. However, the server sequence of operations may conflict with the current state of the remote tree. Additionally or alternatively, the client sequence of operations and the server sequence of operations may conflict with one another.

Accordingly, various embodiments of the subject technology provide additional technical improvements by resolving these conflicts.

For example, the client synchronization service may identify an operation in a sequence of operations (e.g., the client sequence of operations or the server sequence of operations) that conflicts with a rule. Each rule used to identify a conflict may also be associated with a resolution for the conflict. The client synchronization service may update the sequence of operations based on the resolution for the conflict or perform resolve the conflict by performing operations associated with the resolutions for the conflict before providing the sequence of operations for execution.

Figure 7B:
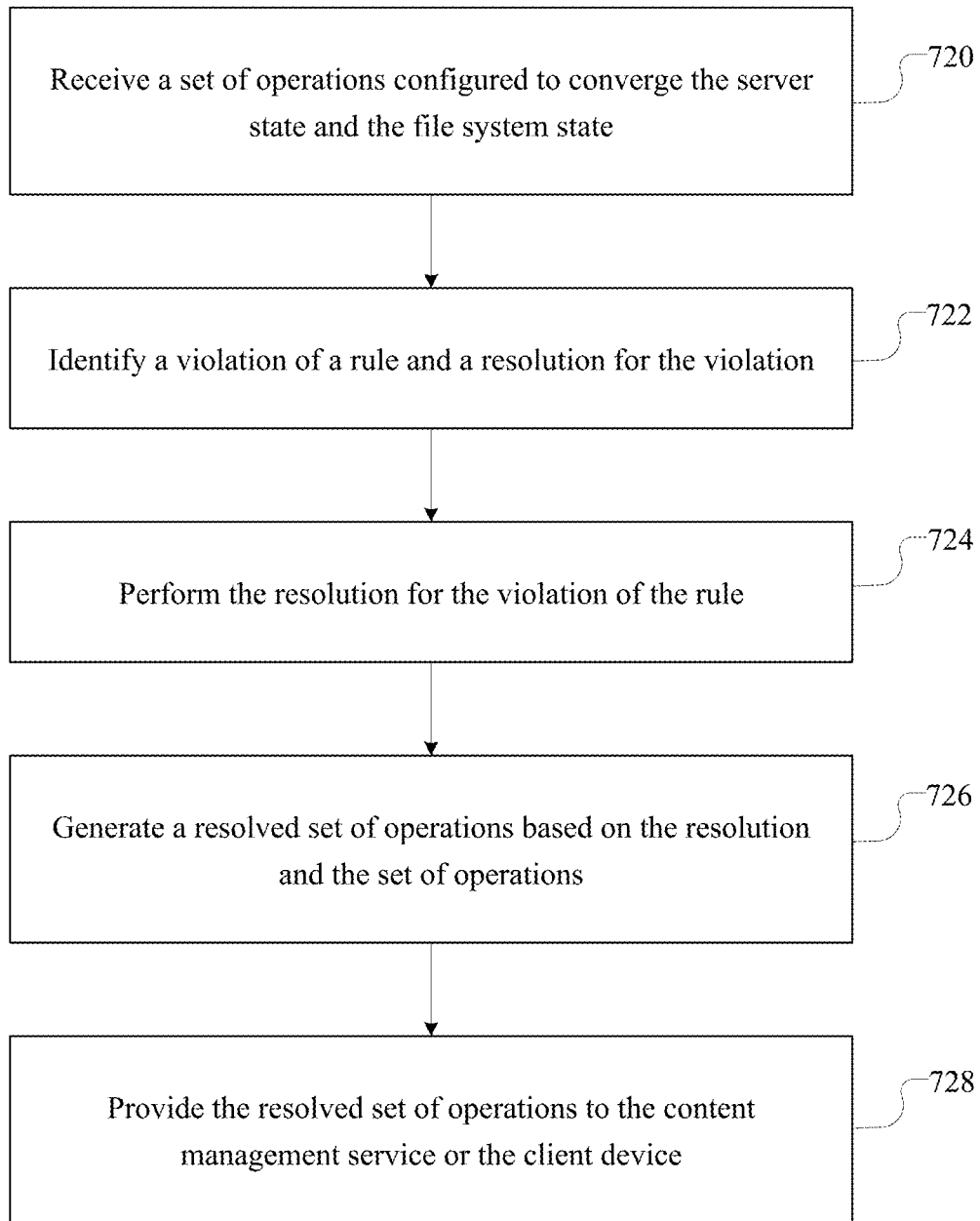
FIG. 7B shows an example method for resolving conflicts when synchronizing a server state and a file system state using tree data structures.

FIG. 7B shows an example method for resolving conflicts when synchronizing a server state and a file system state using tree data structures, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 600 may be implemented by a system such as, for example, client synchronization service 156, running on a client device.

The system may receive a sequence of operations configured to converge a server state and a file system state at operation 720. The sequence of operations may be, for example, the client sequence of operations or the server sequence of operations generated and described with respect to the method 700 of FIG. 7A.

At operation 720, the system identifies one or more violations in the sequence of operations based on a set of rules. The set of rules may be stored by client synchronization service 156 and specify a number of constraints, invariants, or conflicts that need to be resolved. The set of rules are applied to the tree data structures and help control sync behavior. Each rule in the set of rules may also be associated or otherwise linked to a resolution to a violation of that rule. For example, the resolution may include an alteration of one or more operations in the sequence of operations, a removal off one or more operations, an addition of one or more operations, one or more additional actions to the server state or the file state, or a combination of actions.

For each operation in a sequence of operations, the system may determine whether any rule in the set of rules is violated. If a rule is violated, the system identifies a resolution of the violation and, at operation 722, performs the resolution. The resolution may include actions such as modifying one or more operations in the sequence of operations, a removing or adding one or more operations, or additional actions on the server state or the file state.

Once the resolution actions are performed, the system may generate a resolved or rebased sequence of operation based on the resolution and the sequence of operations at operation 724 and, at operation 728, provide the resolved sequence of operations to the appropriate entity for execution. For example, if the sequence of operations is a client sequence of operations, the resolved sequence of operations may be provided to the client device. If the sequence of operations is a server sequence of operations, the resolved sequence of operations may be provided to the content management service. Additionally, the method may be performed on client sequence of operations and server sequence of operations in sequence, in parallel, or in various different orders.

According to some embodiments, each type of operation may be associated with the same or a different set of rules. For example, operation types may include, for example, adding a content item, deleting a content item, editing a content item, moving a content item, renaming a content item, etc. The sequence of operations may consist of operations each belonging to one of the operation types above. Each operation type may be associated with a specific set of rules.

For illustrative purposes, a set of rules for an "Add" operation type may include rules such as file identifiers for content items must be unique in a tree (e.g., no two nodes in a tree may have the same file identifier), a directory file identifier ("DirFileID") specifying the file identifier of a parent node of the content item must exist in the opposite tree data structure, and a DirFileID and file name combination for a content item are not used in the opposite tree.

Opposite tree, as used here, refers to the tree data structure that represents the state of the opposing entity. For example, a client sequence of operations configured to operate on the client device and the resulting changes to the file system on the client device will be reflected in the local tree. Accordingly, the opposite tree for the client sequence of operations is the remote tree. Similarly, a server sequence of operations is configured to be transmitted to the content management system to be executed and the resulting changes to the server state will be reflected in the remote tree. Accordingly, the opposite tree for the server sequence of operations is the local tree.

Figure 8:
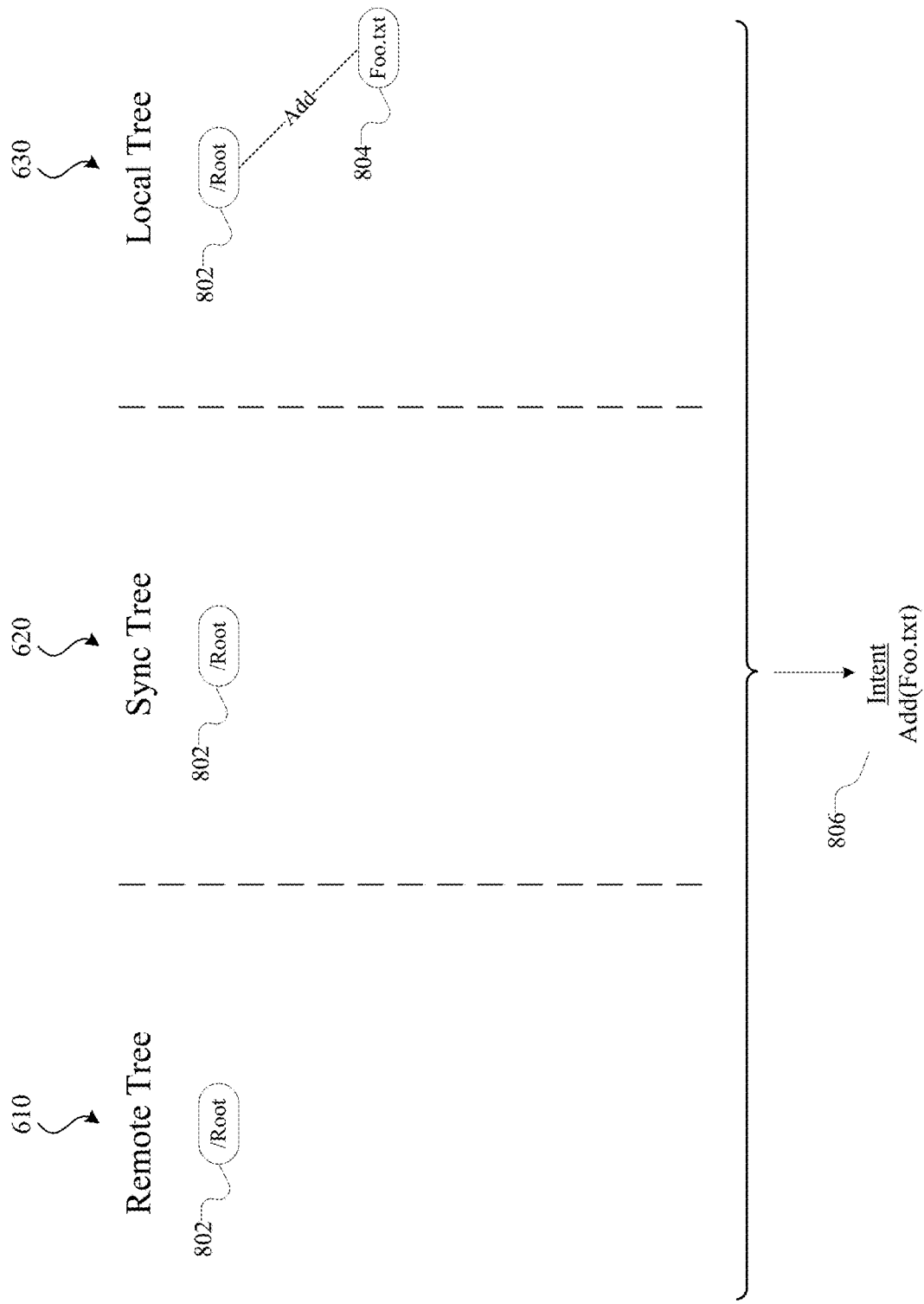
FIG. 8 shows an example update to the tree data structures shown in FIG. 6A, reflecting an intent to modify a content item based on a content item operation.

FIG. 8 illustrates an example state of tree data structures 610, 620, 630 reflecting an operation at client device 150. Intent 806 represents the intended result of the operation at client device 150. In this example, intent 806 shows an add operation for adding "Foo.txt" at client device 150. Local tree 630 has been modified to add node 804 based on intent 806. Node 804 modifies local tree 630 to depict an add of "Foo.txt" within root node 802. As previously explained, when intent 806 is synchronized with content management system 110, client device 150 can update remote tree 610 and sync tree 620 to include node 804 and thus synchronize tree data structures 610, 620, 630 at client device 150. When synchronized, tree data structures 610, 620, 630 reflect a synchronized state at client device 150.

To synchronize intent 806 with content management system 110, client device 150 can commit intent 806 to content management system 110. In this example, client device 150 commits the add of "Foo.txt" to content management system 110 in order to synchronize intent 806 with content management system 110.

Figure 9A:
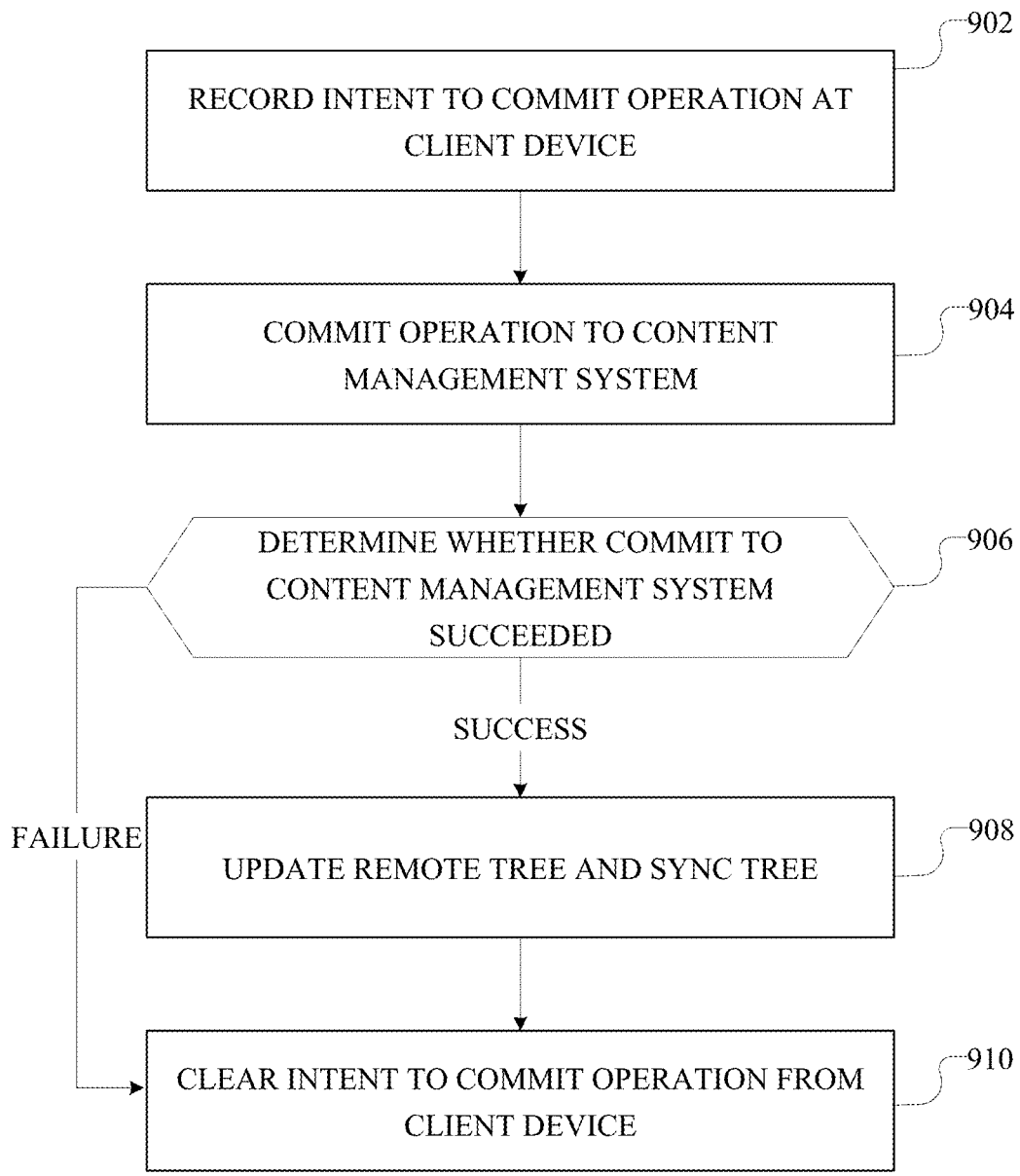
FIG. 9A shows an example method for committing a content item operation to a server file journal.

FIG. 9A illustrates an example method for committing intent 806 to content management system 110. At step 902, client synchronization service 156 on client device 150 records an intent to commit operation (e.g., operation from intent 806) at client device 150. Client synchronization service 156 can record the intent to commit the operation durably on disk or memory at client device 150 to track the pending commit. Client device 150 can store dirty commit records and track modifications until an event triggers removal of the pending commit(s), such as a failure or success.

At step 904, client synchronization service 156 commits the operation to content management system 110 (e.g., file journal interface 202). Client synchronization service 156 can send a message to content management system 110 requesting to commit the operation. The message can include a cursor, as previously explained, which content management system 110 can use to determine the state of content items at client device 150 and the position of client device 150 at server file journal 148. The cursor can include, for example, a server journal ID (SJID) for each namespace associated with client device 150. The SJID indicates the position of client device 150 at server file journal 148 for each namespace, and thus provides the state of each namespace at client device 150.

At step 906, client synchronization service 156 determines whether the commit to content management system 110 from step 904 succeeded. In some cases, content management system 110 can automatically send an error or acknowledgement to client synchronization service 156 in response to the commit, indicating whether the commit succeeded or failed. In some cases, client synchronization service 156 can contact content management system 110 to request an acknowledgement or error notification. For example, client synchronization service 156 can send a message to content management system 110 requesting acknowledgment that the commit succeeded.

If the commit succeeded, content management system 110 can respond to client synchronization service 156 and notify client device 150 that the commit succeeded. If the commit did not succeed, content management system 110 may respond with a failure response or may not respond to the request from client synchronization service 156. If client synchronization service 156 determines the commit failed, at step 910 client synchronization service 156 clears the intent to commit operation from client device 150. If the state at client device 150 is outdated relative to the state at server file journal 148, client synchronization service 156 can receive or request any necessary updates to synchronize the state at client device 150 with the state at server file journal 148.

If client synchronization service 156 determines the commit succeeded, at step 908, client synchronization service 156 updates remote tree 610 and sync tree 620 to include node 804 as shown in FIG. 8. At step 910, client synchronization service 156 then clears the intent to commit the operation from client device 150.

By determining whether the commit to content management system 110 at step 906 succeeded, client synchronization service 156 can prevent conflicts resulting from scenarios where client synchronization service 156 commits an operation and updates its content and tree data structures (610, 620, 630) but the commit does not succeed at content management system 110. This would create a conflict in state between client device 150 and content management system 110.

For example, after client synchronization service 156 commits the operation at step 904, various scenarios can prevent the commit from actually being successfully processed and applied at content management system 110, such as a crash at client device 150 or content management system 110, a network condition (e.g., latency or congestion, network failure, etc.), processing conditions (e.g., long queue at content management system 110, memory errors at content management system 110, etc.), and so forth. At step 906, client synchronization service 156 can thus verify whether the commit succeeded or failed before deciding whether to apply the operation or clear the stored or cached intent to commit at client device 150.

Checking if the commit succeeded and clearing the intent to commit if the commit failed also allows client device 150 to distinguish self-authored operations and avoid conflicting itself through self-authored operations. For example, client device 150 can record the intent to commit for any operations authored by client device 150 as well as an indication that the operations are self-authored. Client device 150 then checks with content management system 110 to verify whether the commit succeeded before applying the operation (e.g., updating the tree data structures). As described further below with respect to FIG. 9B, content management system 110 can guarantee that if it reports to client device 150 that an intent to commit has failed or was not received, such intent to commit will not subsequently succeed if subsequently received by content management system 110. Thus, client device 150 can similarly guarantee that a commit will not succeed after client device 150 indicates the intent to commit failed and clears the intent to commit after receiving a fail or success acknowledgment from content management system 110.

This can prevent a scenario where, for example, client device 150 believes an attempt to commit an operation failed and later receives from content management system 110 an update or indication of a revision based on the operation being subsequently approved by content management system 110. For example, client device 150 may send a commit to content management system 110. If the commit is temporarily lost or delayed, content management system 110 and client device 150 may believe that the commit failed. If the commit later resurfaces and content management system 110 processes and approves the commit after client device 150 has cleared the intent to commit or otherwise marked the intent to commit as failed, the operation associated with the failed commit could inadvertently be propagated to client device 150 even though the operation should have never been approved. Client device 150 may receive the operation and not realize the operation is its own operation from the previous failed commit, and apply the operation believing the operation was generated and synchronized from another device. Unable to distinguish the operation as the self-authored operation associated with the previous failed commit, client device 150 may apply the operation and create a conflict in the state of the associated content item(s) or namespace(s). The client device's own operation may thus create a conflict at the client device caused by the client device failing its own operation and subsequently applying the same operation under the belief the operation is a new revision generated by another device and propagated to the client device.

Figure 9B:
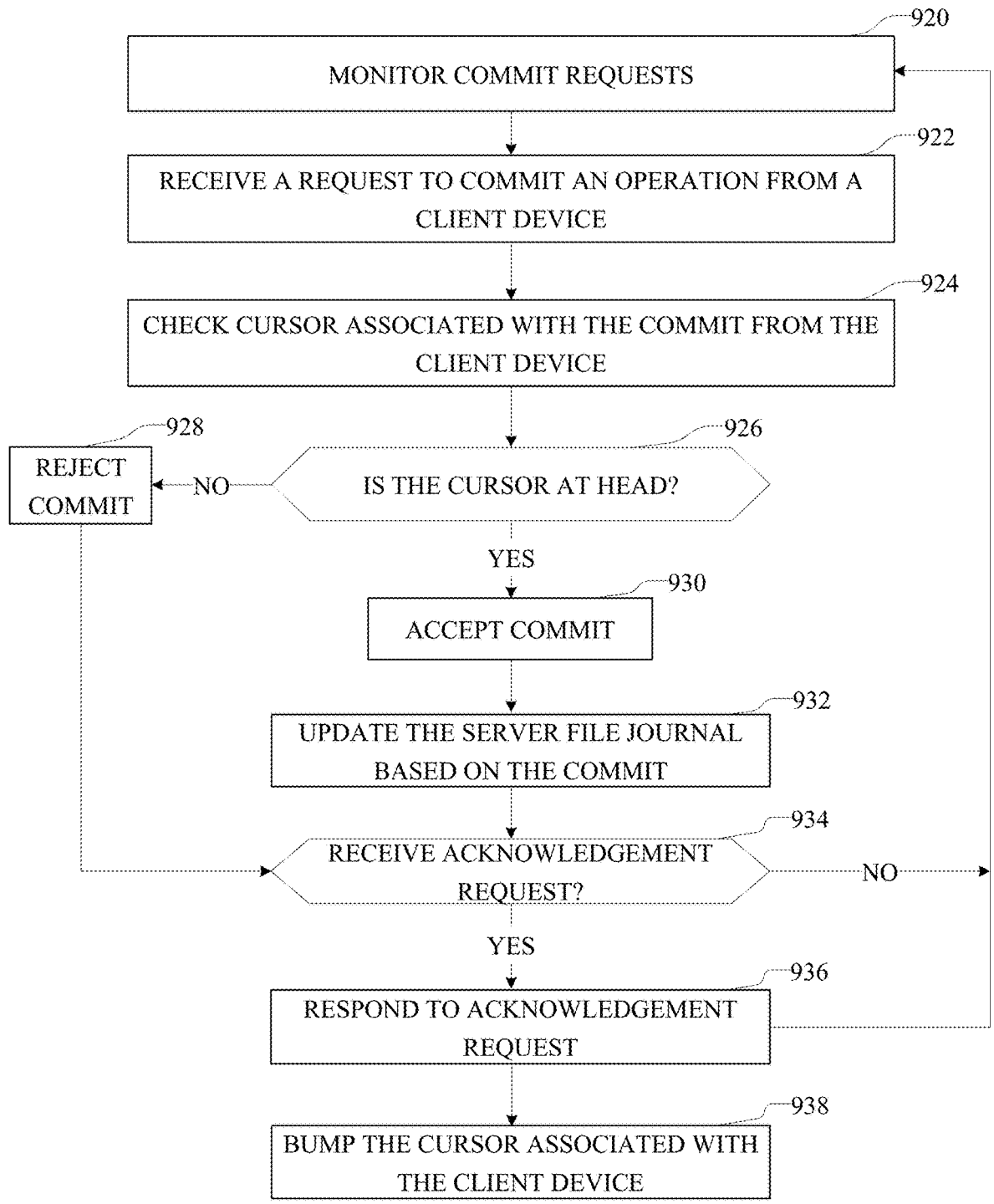
FIG. 9B shows an example method for processing a request to commit a content item operation from a client device.

FIG. 9B illustrates an example method for processing commits at content management system 110. At step 920, file journal interface 202 monitors commit requests from client devices (e.g., client device 150). At step 922, file journal interface 202 receives a request to commit an operation from client device 150 (e.g., client synchronization service 156). The request can identify the operation associated with the commit and a cursor associated with client device 150. For example, the request can be a request from client synchronization service 156 to commit intent 806 as shown in FIG. 9A. Thus, the request can identify the add operation (e.g., Add "Foo.txt") corresponding to intent 806 shown in FIG. 8, and the cursor at client device 150. The cursor at client device 150 can be the last or most current cursor received by client device 150 from file journal interface 202.

As previously explained, the cursor can identify the position of client device 150 at server file journal 148, which reflects the latest revisions or state of each namespace at client device 150 relative to the revisions or state at server file journal 148 for each of the namespaces. For example, the cursor can identify a server file journal identifier (SJID) for each namespace at client device 150. The SJID of a namespace indicates the latest SJID (e.g., row, revision, or state) for that namespace obtained by client device 150. The cursor can thus indicate whether client device 150 has received the latest revision in server file journal 148 for each namespace at client device 150.

In response to the request to commit the operation, at step 924, file journal interface 202 checks the cursor associated with the commit from client device 150. At step 926, file journal interface 202 determines if the cursor is at head. Here, file journal interface 202 determines if the revision (SJID) identified by the cursor for each namespace in the cursor is the latest revision for that namespace on server file journal 148.

For example, if the cursor identifies SJID 50 for namespace 2, file journal interface 202 determines if SJID 50 is the latest SJID (e.g., the latest row or revision) for namespace 2 in server file journal 148 (e.g., journal 400). If so, then the cursor from client device 150 is at head, meaning it is at the end of server file journal 148 for each namespace at client device 150, which indicates that client device 150 has obtained the latest revisions or state in server file journal 148 for each namespace at client device 150. If not, the cursor from client device 150 is not at head, meaning it is not at the end of server file journal 148 for each namespace at client device 150, which indicates that client device 150 has not obtained the latest revisions or state in server file journal 148 for each namespace at client device 150. In other words, the content items at client device 150 associated with one or more namespaces are outdated.

If the cursor is not at head, at step 928, file journal interface 202 rejects the commit from client device 150. For example, based on the cursor not being at head, file journal interface 202 can determine that the operation associated with the commit from client device 150 modifies a content item(s) and/or namespace(s) that is outdated (e.g., does not reflect the latest revisions at server file journal 148) and may create a conflict with the revisions at server file journal 148 for that content item(s) and/or namespace(s). File journal interface 202 can thus reject the commit to prevent a conflict being created by the operation associated with the commit. File journal interface 202 can send a response to client device 150 indicating that the commit has been rejected. File journal interface 202 can also send the latest revisions or state in server file journal 148 to client device 150, or prompt client device 150 to perform an update.

If the cursor is at head, at step 930, file journal interface 202 can accept the commit. In some cases, file journal interface 202 can perform another check to verify the operation will not create a conflict prior to accepting the commit. For example, in addition to determining that the cursor is at head, file journal interface 202 can also compare the revision reflected by the operation associated with the commit (e.g., intent 806) with the revisions at server file journal 148 to verify that the operation will not create a conflict even if the cursor is at head. To illustrate, assume the operation is a delete operation for a file and file journal interface 202 determines that the cursor is at head. Before accepting the commit, file journal interface 202 can verify that server file journal 148 includes a previous revision adding the file to a specific namespace. If file journal interface 202 determines that server file journal 148 does not include a revision for adding the file to the namespace, file journal interface 202 can identify a conflict between the delete operation and the lack of an add revision. File journal interface 202 can then reject the commit, reconcile the conflict, and/or ask client device 150 to reconcile the conflict.

After accepting the commit, at step 932, file journal interface 202 updates server file journal 148 based on the commit. For example, file journal interface 202 can write a revision to server file journal 148 reflecting the operation associated with the commit. File journal interface 202 can translate the operation to a revision, as previously described, and write the revision for the namespace associated with the operation.

At step 934, file journal interface 202 can determine if it received an acknowledgment request from client device 150. For example, client device 150 can send a request to file journal interface 202 for acknowledgment of the commit in order to determine if the commit failed or succeeded. At step 936, file journal interface 202 can respond to the acknowledgment request from client device 150. File journal interface 202 can notify client device 150 of the status of the commit, including whether the commit succeeded or failed.

At step 938, file journal interface 202 can bump the cursor associated with client device 150. For example, assume the cursor from client device 150 identifies SJID 6 for namespace 1 as the latest revision for namespace 1 at client device 150, and the operation associated with the commit corresponds to namespace 1. File journal interface 202 can bump the cursor associated with namespace 1 from SJID 6 to SJID 7. File journal interface 202 can provide the updated cursor to client device 150, and client device 150 can use the updated cursor for future commits.

File journal interface 202 can bump the cursor after updating server file journal 148 or after receiving an acknowledgment request from client device 150. In some cases, file journal interface 202 can bump the cursor after receiving an acknowledgment request from client device 150 even if the commit associated with the acknowledgement request was not accepted by file journal interface 202. For example, if file journal interface 202 receives an acknowledgment request from client device 150, it can bump the cursor based on the acknowledgment request even if file journal interface 202 never received or approved the associated request to commit. By bumping the cursor, file journal interface 202 can guarantee that once it indicates to client device 150 that the commit has not been accepted or recorded, the commit will not be subsequently accepted or recorded.

For example, when client device 150 sends a request to commit to file journal interface 202, in some cases the request can be temporarily lost or delayed for a variety of reasons, such as network or computing issues (e.g., latency, congestion, crashes, client-side task cancellation, etc.). As a result, file journal interface 202 may not receive the request to commit until later than expected. For example, file journal interface 202 may receive an acknowledgment request from client device 150, respond to the acknowledgment request, only to later receive the original request to commit from client device 150. In this example, if file journal interface 202 responds to client device 150 with an indication that the commit was not recorded, received, or approved, and subsequently receives and approves/records the commit, such commit can create a conflict between the state at content management system 110 and client device 150.

Thus, to guarantee that when file journal interface 202 tells client device 150 that a commit was not recorded or approved, such commit will not be later committed even if subsequently received by file journal interface 202, file journal interface 202 can bump the cursor to ensure a lost or delayed commit will be rejected if it resurfaces. For example, when file journal interface 202 receives a request to commit after responding to client device 150 that the commit was not recorded or approved, file journal interface 202 checks if the cursor is at head as explained in step 926. Since file journal interface 202 has bumped the cursor since the request to commit was initially sent by client device 150, file journal interface 202 will determine that the cursor associated with the request to commit is not at head and thereafter reject the request to commit as explained in step 928. Accordingly, file journal interface 202 can prevent conflicts or errors resulting from commits delayed or lost during processing or transmission. In other words, if a commit has not been approved or received when the cursor is bumped, bumping the cursor will ensure that such commit is never approved or recorded.

This also prevents conflicts at client device 150 from self-authored operations, as previously explained. For example, if client device 150 fails an intent to commit at client device 150, bumping the cursor will ensure a failed commit is not subsequently recorded by file journal interface 202 and propagated to client device 150.

Bumping the cursor can also prevent various modification or commit races that could be potentially created with other approaches, such as a "commit again" approach where client device 150 and/or file journal interface 202 can retry a failed commit. Below is a non-limiting example of such a race or condition prevented by bumping the cursor.

Client device 150 records intent 806 to add "Foo.txt" with blocklist A. The commit request from client device 150 is dispatched to file journal interface 202 but delayed at the network. In addition, client device 150 crashes after sending the commit. Client device 150 then comes back online and in recovery mode attempts to re-commit the add. File journal interface 202 rejects the commit because "Foo.txt" is already latest elsewhere. Client device 150 interprets the rejected commit as proof that its own commit which is in flight has failed and consequently clears the intent to commit cache/log at client device 150. Client device 150 then edits "Foo.txt" on client device 150 to blocklist B. "Foo.txt" is deleted remotely by another user or device. The original commit request for intent 806 from client device 150 then arrives at file journal interface 202 and is accepted by file journal interface 202. Client device 150 then pulls the add of "Foo.txt" with blocklist A from file journal interface 202 at the same path as the edited "Foo.txt" with blocklist B. Client device 150 now has a conflict between the edited "Foo.txt" with blocklist B and its own previous add of "Foo.txt" with blocklist A. Accordingly, client device 150 has inadvertently conflicted itself.

This example scenario would be prevented by bumping the cursor. For example, when file journal interface 202 later receives the add commit for "Foo.txt" with blocklist A, file journal interface 202 checks the cursor and determines that the cursor is not at head (e.g., step 926), as the cursor has been bumped since the commit was sent by client device 150. File journal interface 202 will then reject the commit and prevent client device 150 from pulling the add of "Foo.t"t" with blocklist A from file journal interface 202. Thus, once client device 150 determines a commit has failed and clears the intent to commit cache/log, the commit is guaranteed to never succeed. Accordingly, file journal interface 202 and client device 150 can guarantee that client device 150 will not pull the add of "Foo.txt" with blocklist A after the edit of "Foo.txt" in the previous example, and create a conflict between "Foo.txt" with blocklist A and "Foo.txt" with blocklist B at the same path.

Figure 10:
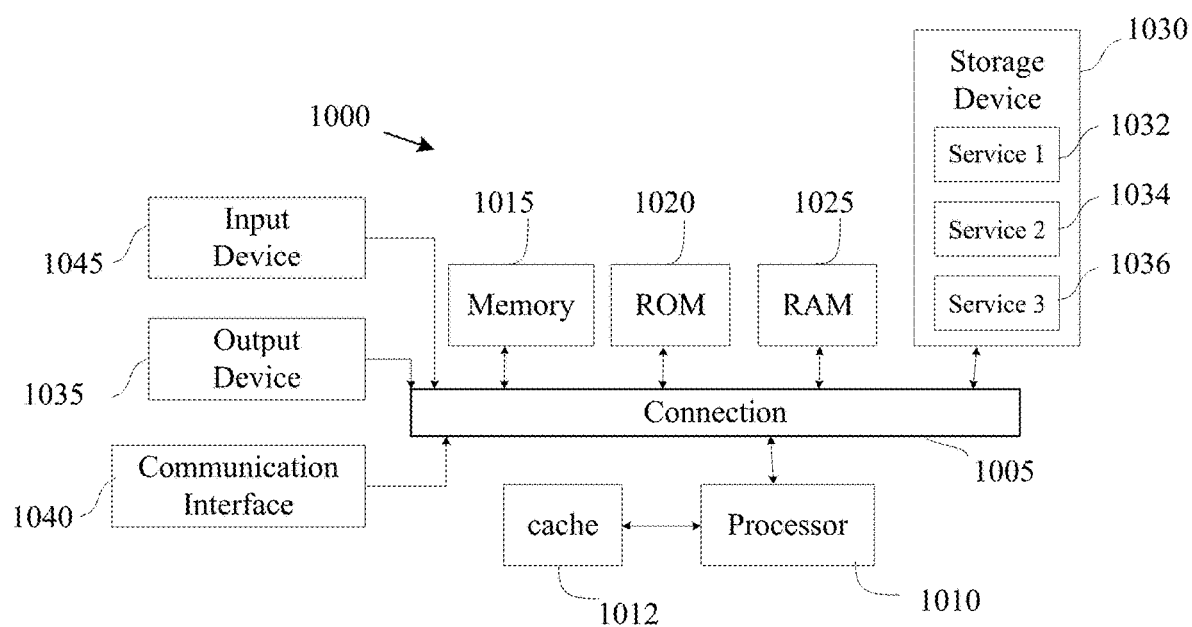
FIG. 10 shows an example of a system for implementing various aspects of the present technology.

FIG. 10 shows an example computing system 1000, which can be, for example, any computing device such as client device 150, content management system 110 or any component thereof. The components of computing system 1000 are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments computing system 1000 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read only memory (ROM) 1020 and random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   generating, at a client device, an operation modifying a local copy of a content item associated with a user account at a content management system;
   recording, at the client device, an intent to commit the operation to a journal of revisions on the content management system, the journal of revisions tracking revisions to content items associated with one or more namespaces associated with the user account;
   based on the operation, sending, by the client device to the content management system, a first request to commit the operation to the journal of revisions, the first request comprising a cursor identifying a current position of the client device at the journal of revisions, the cursor including an FSAuth token and last observed access permissions to an identifier of the one or more namespaces to verify authorization of requesting the commit of the operation to the journal of revisions;
   receiving, by the client device from the content management system, a determination that the cursor is at an end of the journal of revisions indicating that the client device is receiving a latest revision of the content items associated with the one or more namespaces;
   sending, by the client device to the content management system, a second request for a status of the commit at the content management system;
   receiving, by the client device from the content management system, a response to the second request;
   determining, by the client device, whether the response comprises an indication that the commit of the operation to the journal of revisions succeeded; and
   based on whether the response comprises the indication that the commit of the operation to the journal of revisions succeeded, determining whether to update one or more tree data structures on the client device and clear the intent to commit,
   the one or more tree data structures comprising a synchronization tree representing a comparison between a local state and a remote state associated with the content items including the content item.

2. The method of claim 1, wherein the one or more tree data structures further comprise a local tree and a remote tree,
   the local tree representing the local state of content items associated with the user account, and
   the remote tree representing the remote state at the content management system of the content items associated with the user account.

3. The method of claim 2, further comprising:
   when the response comprises the indication that the commit of the operation to the journal of revisions succeeded:
      updating the remote tree and the synchronization tree to reflect a modification to the content item based on the operation; and
      clearing the intent to commit at the client device.

4. The method of claim 3, further comprising updating the local tree to reflect the modification to the local copy of the content item, wherein recording the intent to commit comprises indicating that the operation comprises a self-authored operation generated by the client device.

5. The method of claim 2, further comprising:
   when the response does not comprise the indication that the commit of the operation to the journal of revisions succeeded, clearing the intent to commit at the client device without updating the remote tree or the synchronization tree to reflect a modification to the content item based on the operation.

6. The method of claim 1, wherein the cursor identifies the current position in the journal based on a respective namespace identifier of one or more namespaces associated with the content item and a respective revision number associated with the respective namespace identifier.

7. The method of claim 6, further comprising: obtaining, by the client device from the content management system, an updated cursor that increments the respective revision number associated with the respective namespace identifier, the updated cursor being based on at least one of the first request or the second request.

8. The method of claim 1, wherein the cursor comprises a respective namespace identifier of one or more namespaces associated with the content item and a respective revision number previously received by the client device for the respective namespace identifier, the method further comprising: receiving, by the client device from the content management system, the indication that the commit succeeded when the respective revision number comprises a latest revision at the journal of revisions corresponding to the respective namespace identifier.

9. A non-transitory computer readable medium comprising instructions, the instructions, when executed by a computing device, cause the computing device to:
   generate an operation modifying a local copy of a content item associated with a user account at a content management system;
   record an intent to commit the operation to a journal of revisions on the content management system, the journal of revisions tracking revisions to content items associated with one or more namespaces associated with the user account;
   based on the operation, send, to the content management system, a first request to commit the operation to the journal of revisions, the first request comprising a cursor identifying a current position of the computing device in the journal of revisions, the cursor including an FSAuth token and last observed access permissions to an identifier of the one or more namespaces to verify authorization of requesting the commit of the operation to the journal of revisions;
   receive, from the content management system, a determination that the cursor is at an end of the journal of revisions indicating that the computing device is receiving a latest revision of the content items associated with the one or more namespaces;
   send, to the content management system, a second request for a status of the commit at content management system;
   based on the second request, determine whether the commit of the operation to the journal of revisions has succeeded; and
   based on whether the commit of the operation to the journal of revisions has succeeded, determine whether to update one or more tree data structures on the computing device and clear the intent to commit,
   the one or more tree data structures comprising a synchronization tree representing a comparison between a local state and a remote state associated with the content items including the content item.

10. The non-transitory computer readable medium of claim 9, wherein the one or more tree data structures further comprise a local tree and a remote tree, the local tree representing the local state of content items associated with the user account, and the remote tree representing the remote state at the content management system of the content items associated with the user account.

11. The non-transitory computer readable medium of claim 10, storing instructions which, when executed by the computing device, cause the computing device to:

based on a determination that the commit of the operation to the journal of revisions succeeded:

update the remote tree and the synchronization tree to reflect a modification to the content item based on the operation; and clear the intent to commit at the computing device.

12. The non-transitory computer readable medium of claim 11, storing instructions which, when executed by the computing device, cause the computing device to update the local tree to reflect the modification to the local copy of the content item, wherein recording the intent to commit comprises indicating that the operation comprises a self-authored operation generated by the computing device.

13. The non-transitory computer readable medium of claim 10, storing instructions which, when executed by the computing device, cause the computing device to:

based on a determination that the commit of the operation to the journal of revisions has not succeeded, clear the intent to commit at the computing device without updating the remote tree or the synchronization tree based on the operation.

14. The non-transitory computer readable medium of claim 9, wherein the cursor identifies the current position in the journal based on a respective namespace identifier of one or more namespaces associated with the content item and a respective revision number associated with the respective namespace identifier, the non-transitory computer readable medium storing instructions which, when executed by the computing device, cause the computing device to:

obtain, from the content management system, an updated cursor that increments the respective revision number associated with the respective namespace identifier, the updated cursor being based on at least one of the first request or the second request.

15. The non-transitory computer readable medium of claim 9, wherein the cursor comprises a respective namespace identifier of one or more namespaces associated with the content item and a respective revision number previously received by the computing device for the respective namespace identifier, the non-transitory computer readable medium storing instructions which, when executed by the computing device, cause the computing device to:

receive, from the content management system, a response to the second request, the response indicating that the commit succeeded when the respective revision number comprises a latest revision at the journal of revisions corresponding to the respective namespace identifier.

16. A computing device comprising:

one or more processors; and at least one non-transitory computer readable medium having stored therein instructions which, when executed by the one or more processors, cause the computing device to:

generate an operation modifying a local copy of a content item associated with a user account at a content management system;

record an intent to commit the operation to a journal of revisions at the content management system, the journal of revisions tracking revisions to content items associated with one or more namespaces associated with the user account;

based on the operation, send, to the content management system, a first request to commit the operation at the journal of revisions, the first request comprising a cursor identifying a current position of the computing device in the journal of revisions, the cursor including an FSAuth token and last observed access permissions to an identifier of the one or more namespaces to verify authorization of requesting the commit of the operation to the journal of revisions;

receive, from the content management system, a determination that the cursor is an end of the journal of revisions indicating that the computing device is receiving a latest revision of the content items associated with the one or more namespaces;

send, to the content management system, a second request for a status of the commit at content management system;

based on the second request, determine whether the commit of the operation to the journal of revisions has succeeded; and based on whether the commit of the operation to the journal of revisions has succeeded, determine whether to update one or more tree data structures on the computing device and clear the intent to commit, the one or more tree data structures comprising a synchronization tree representing a comparison between a local state and a remote state associated with the content items including the content item.

17. The computing device of claim 16, wherein the one or more tree data structures further comprise a local tree and a remote tree, the local tree representing the local state of content items associated with the user account, and the remote tree representing the remote state at the content management system of the content items associated with the user account.

18. The computing device of claim 17, storing instructions which, when executed by the one or more processors, cause the computing device to:

based on a determination that the commit of the operation to the journal of revisions succeeded:

update the remote tree and the synchronization tree to reflect a modification to the content item based on the operation; and clear the intent to commit at the computing device.

19. The computing device of claim 17, storing instructions which, when executed by the one or more processors, cause the computing device to:

based on a determination that the commit of the operation to the journal of revisions has not succeeded, clear the intent to commit at the computing device without updating the remote tree or the synchronization tree based on the operation.

20. The computing device of claim 16, wherein the cursor identifies the current position in the journal based on a respective namespace identifier of one or more namespaces associated with the content item and a respective revision number associated with the respective namespace identifier, the non-transitory computer readable medium storing instructions which, when executed by the one or more processors, cause the computing device to:

obtain, from the content management system, an updated cursor that increments the respective revision number associated with the respective namespace identifier, the updated cursor being based on at least one of the first request or the second request.

\* \* \* \* \*